(12) United States Patent
Okabe et al.

(10) Patent No.: US 8,962,115 B2
(45) Date of Patent: Feb. 24, 2015

(54) FIRE-RESISTANT PIPING MATERIAL

(75) Inventors: Masashi Okabe, Tokyo (JP); Koji Ichihara, Kyoto (JP); Hideharu Kimura, Kyoto (JP); Toshifumi Sanni, Yamagucchi (JP)

(73) Assignee: Sekisui Chemical Co., Ltd., Osaka (JP)

( * ) Notice: Subject to any disclaimer, the term of this patent is extended or adjusted under 35 U.S.C. 154(b) by 349 days.

(21) Appl. No.: 12/733,359

(22) PCT Filed: Aug. 29, 2007

(86) PCT No.: PCT/JP2007/066765
§ 371 (c)(1),
(2), (4) Date: Feb. 25, 2010

(87) PCT Pub. No.: WO2009/028057
PCT Pub. Date: Mar. 5, 2009

(65) Prior Publication Data
US 2010/0173109 A1 Jul. 8, 2010

(51) Int. Cl.
*F16L 11/12* (2006.01)
*C08K 3/04* (2006.01)
*B32B 1/08* (2006.01)
*B32B 27/18* (2006.01)
*B32B 27/30* (2006.01)
(Continued)

(52) U.S. Cl.
CPC ... *C08K 3/04* (2013.01); *B32B 1/08* (2013.01); *B32B 27/18* (2013.01); *B32B 27/30* (2013.01); *F16L 5/04* (2013.01); *F16L 55/1026* (2013.01); *F16L 59/145* (2013.01); *C08L 27/06* (2013.01)
USPC ....... 428/35.9; 428/35.7; 428/36.6; 428/36.9; 428/36.91

(58) Field of Classification Search
USPC .......... 521/137, 134, 145; 252/606, 609, 704; 428/35.9, 35.7, 36.6, 36.9, 36.91
See application file for complete search history.

(56) References Cited

U.S. PATENT DOCUMENTS 3,645,837 A * 2/1972 Chisholm et al. .......... 428/316.6
4,186,778 A * 2/1980 Carey ............................ 138/103
(Continued)

FOREIGN PATENT DOCUMENTS

JP 9-176498 7/1997
JP 9-309990 12/1997
(Continued)

OTHER PUBLICATIONS

International Search Report issued Oct. 30, 2007 in International (PCT) Application No. PCT/JP2007/066765.

*Primary Examiner* — Ellen S Wood
(74) *Attorney, Agent, or Firm* — Wenderoth, Lind & Ponack, L.L.P.

(57) ABSTRACT

It is an object to provide a fire-resistant piping material that can be fire-protection measures by itself and is excellent in construction workability. A single-layered fire-resistant piping material according to the present invention is constituted of a fire-resistant resin composition containing heat-expandable graphite in an amount of 1 to 10 parts by weight based on 100 parts by weight of a polyvinyl chloride-based resin. A multilayered fire-resistant piping material according to the present invention includes a tubular fire-resistant expandable layer made of a heat-expandable fire-resistant resin composition and a covering layer covering at least one of the outer surface and the inner surface of the fire-resistant expandable layer, and the fire-resistant expandable layer is formed of a fire-resistant resin composition containing heat-expandable graphite in an amount of 1 to 15 parts by weight based on 100 parts by weight of a polyvinyl chloride-based resin, and the covering layer is formed of a polyvinyl chloride-based resin composition not containing heat-expandable fire-resistant materials.

1 Claim, 4 Drawing Sheets

(51) Int. Cl.
*F16L 5/04* (2006.01)
*F16L 55/10* (2006.01)
*F16L 59/14* (2006.01)
*C08L 27/06* (2006.01)

(56) References Cited

U.S. PATENT DOCUMENTS 6,124,394 A * 9/2000 Goto et al. .................. 524/495
6,293,311 B1 * 9/2001 Bushi et al. ................. 138/138

2003/0008090 A1 * 1/2003 Rohde et al. ................. 428/35.7
2007/0282027 A1 * 12/2007 Fujimoto et al. .............. 521/137
2008/0011383 A1 * 1/2008 Paetow et al. ................ 138/177

FOREIGN PATENT DOCUMENTS

| | | |
|---|---|---|
| JP | 2002-71082 | 3/2002 |
| JP | 2002-80612 | 3/2002 |
| JP | 2006-161982 | 6/2006 |
| JP | 2006-348228 | 12/2006 |

* cited by examiner

FIRE-RESISTANT PIPING MATERIAL

This application is a U.S. national stage of International Application No. PCT/JP2007/066765 filed Aug. 29, 2007.

TECHNICAL FIELD

The present invention particularly relates to a fire-resistant piping material that is excellent in fire resistance and is used in a construction passing through a partition of a building.

BACKGROUND ART

Buildings have fireproof compartments defined depending on the types and specifications of the buildings. In the fireproof compartments, according to the specifications, flooring materials and wall materials for fireproof construction or semi-fireproof construction prescribed by the Building Standards Act are used. The flooring materials and the wall materials for fireproof construction or semi-fireproof construction prescribed by the Building Standards Act are those defined by the Minister of Land, Infrastructure, Transport and Tourism or certified by the Minister of Land, Infrastructure, Transport and Tourism, and examples thereof include ferroconcrete; concrete blocks, brick constructions, and stone constructions that are reinforced with iron materials; iron materials covered with steel mortar or concrete on both surfaces thereof; lightweight foamed concrete; precast concrete plates; and laminates of plywood and gypsum board, hard wood chip cement board, or lightweight foamed concrete.

Incidentally, buildings are provided with piping (such as electrical conduits, drain pipes, and ducts). Such piping passes through the above-mentioned fireproof compartment in some cases.

When a through-hole through which piping or the like passes (hereinafter, referred to as "compartment pass-through portion") is provided to the above-mentioned fireproof compartment, occurrence of fire may cause a big fire accident within a short period of time by that the fire and smoke quickly penetrate from the room where the fire occurred to the next room having the fireproof compartment therebetween through the compartment pass-through portion.

Therefore, the Building Standards Act establishes that only materials that passed a fire-resistant test for compartment pass-through and certified by the Minister of Land, Infrastructure, Transport and Tourism or evaluated by fire defense can be used as the piping material passing through the compartment pass-through portion in a building.

Therefore, the compartment pass-through portion is provided with fire-protection measures for caulking a gap with a noncombustible material such as mortar after installing the piping passing through the compartment so that no gap is formed between the compartment pass-through portion and the piping.

When the piping material is a metal, since the piping material itself is heat resistant and noncombustible, a sufficient effect is observed only by caulking the gap with a noncombustible material such as mortar, as described above. However, the metal piping has a large weight and therefore has a problem that the workability in transferring and in construction is inferior.

On the other hand, when the piping material is a synthetic resin, the piping is light in weight, excellent in workability, and easy to bond, compared to the metal piping. The synthetic resin piping has thus various merits, but is inferior in heat resistance and fire resistance. Therefore, in fire, the piping material is lost by burning or is deformed by the heat to generate a gap between the compartment pass-through portion and the piping material, which may allow the heat, fire, and smoke occurred at one side of the fireproof compartment to reach the other side.

Accordingly, for example, it is employed fire-protection measures in which a sheet-like covering material having fire-resistance and expansibility is wound on the outer surface of the synthetic resin piping material. As the fire-resistant resin composition constituting the sheet-like covering material, proposed are those in which a vinyl chloride-based resin is blended with heat-expandable graphite, an inorganic filler, and a plasticizer and also blended with a specific phosphorus compound (for example, refer to Patent Document 1) and those in which a base resin, such as rubber, a thermoplastic elastomer, or a liquid polymer, is blended with heat-expandable graphite serving as an inorganic expansion agent and also blended with a resin serving as a deformation-preventing resin, such as a polycarbonate resin or a polyphenylene sulfide resin (for example, refer to Patent Document 2).

However, in the fire-protection measures using the sheet-like covering material, a synthetic resin piping material is temporarily installed, and then the sheet-like covering material is wound to the piping material at a portion previously determined. Subsequently, the piping material is supported and fixed, and then the opening is filled back with mortar. Therefore, the measures has a large number of work units and takes a long time and also has a problem that the adjustment of the piping position after the winding of the sheet-like covering material to the piping material is difficult.

Accordingly, the above-mentioned problems can be solved by directly producing a piping material with a resin composition having fire-resistance and expansibility, but since the fire-resistant resin composition in Patent Document 1 contains large amounts of an inorganic filler and a plasticizer in a vinyl chloride-based resin, the piping material formed therewith cannot obtain a high mechanical strength that is an indispensable requirement in a pipe. Furthermore, since the fire-resistant resin composition in Patent Document 2 contains rubber, a thermoplastic elastomer, or a liquid polymer as the base resin, the piping material formed therewith cannot obtain a high mechanical strength that is an indispensable requirement in a pipe, as in the fire-resistant resin composition of Patent Document 1.

[Patent Document 1] Japanese Unexamined Patent Application Publication No. 2006-348228
[Patent Document 2] Japanese Patent No. 3133683

DISCLOSURE OF INVENTION

The present invention has been proposed in the light of the above-mentioned problems, and it is an object thereof to provide a fire-resistant piping material that can be fire-protection measures by itself.

In order to solve the above-mentioned problems, a single-layered fire-resistant piping material of the invention according to Embodiment 1 is constituted of a fire-resistant resin composition containing heat-expandable graphite in an amount of 1 to 10 parts by weight based on 100 parts by weight of a polyvinyl chloride-based resin.

A single-layered fire-resistant piping material of the invention according to Embodiment 2 is constituted of a fire-resistant resin composition containing heat-expandable graphite having a pH of 1.5 to 4.0 in an amount of 1 to 10 parts by weight based on 100 parts by weight of a polyvinyl chloride-based resin.

In a single-layered fire-resistant piping material of the invention according to Embodiment 3, in the invention according to Embodiment 2, the fire-resistant resin composition according to Embodiment 2 contains an additive for providing heat stability during molding.

In a single-layered fire-resistant piping material of the invention according to Embodiment 4, in the invention according to Embodiment 3, at least one selected from the group consisting of lead-based stabilizers, organic tin-based stabilizers, and higher fatty acid metal salts is contained as the additive for providing heat stability during molding at a total additive amount of 0.3 to 5.0 parts by weight based on 100 parts by weight of the polyvinyl chloride-based resin.

A single-layered fire-resistant piping material of the invention according to Embodiment 5, in the invention according to Embodiment 4, further includes a basic compound as the additive for providing heat stability during molding in a total additive amount of 0.3 to 5.0 parts by weight based on 100 parts by weight of the polyvinyl chloride-based resin.

A single-layered fire-resistant piping material of the invention according to Embodiment 6 is constituted of a fire-resistant resin composition containing heat-expandable graphite having an expansion volume in the range of 100 to 250 mL/g in an amount of 1 to 10 parts by weight based on 100 parts by weight of a polyvinyl chloride-based resin.

A single-layered fire-resistant piping material of the invention according to Embodiment 7 is constituted of a fire-resistant resin composition containing heat-expandable graphite having a 1.3-time expansion temperature of 180 to 240° C. in an amount of 1 to 10 parts by weight based on 100 parts by weight of a polyvinyl chloride-based resin.

In a single-layered fire-resistant piping material of the invention according to Embodiment 8, in the invention according to any one of Embodiments 1 to 7, when the piping material is constructed so as to pass through a flooring material and is subjected to a fire-resistant test (complying with ISO 834-1) in which the underside of the floor is heated under conditions that one end of the piping material is exposed to a heating side by 300 mm from the surface on the heating side of the flooring material and that the other end of the piping material is exposed to a non-heating side by 800 mm from the surface on the non-heating side of the flooring material, a pipe inner cross-sectional area S1 at the end of the piping material before burning on the heating side and a pipe inner cross-sectional area S2 at a minimum inner diameter of the piping material after burning satisfy a relationship of $(S2/S1) \times 100 \leq 50$.

The invention according to Embodiment 9 provides a multilayered fire-resistant piping material including a tubular fire-resistant expandable layer made of a heat-expandable fire-resistant resin composition and a covering layer covering at least one of the outer surface and the inner surface of the fire-resistant expandable layer. The fire-resistant expandable layer is formed of a fire-resistant resin composition containing heat-expandable graphite in an amount of 1 to 15 parts by weight based on 100 parts by weight of a polyvinyl chloride-based resin, and the covering layer is formed of a polyvinyl chloride-based resin composition not containing heat-expandable fire-resistant materials.

The invention according to Embodiment 10 provides a multilayered fire-resistant piping material including a tubular fire-resistant expandable layer made of a heat-expandable fire-resistant resin composition and a covering layer covering at least one of the outer surface and the inner surface of the fire-resistant expandable layer. The fire-resistant expandable layer is formed of a fire-resistant resin composition containing heat-expandable graphite having a pH of 1.5 to 4.0 in an amount of 1 to 15 parts by weight based on 100 parts by weight of a polyvinyl chloride-based resin, and the covering layer is formed of a polyvinyl chloride-based resin composition not containing heat-expandable fire-resistant materials.

In a multilayered fire-resistant piping material of the invention according to Embodiment 11, in the invention according to Embodiment 10, the fire-resistant resin composition according to Embodiment 10 contains an additive for providing heat stability during molding.

A multilayered fire-resistant piping material of the invention according to Embodiment 12, in the invention according to Embodiment 11, includes at least one selected from the group consisting of lead-based stabilizers, organic tin-based stabilizers, and higher fatty acid metal salts as the additive for providing heat stability during molding in a total additive amount of 0.3 to 5.0 parts by weight based on 100 parts by weight of the polyvinyl chloride-based resin.

A multilayered fire-resistant piping material of the invention according to Embodiment 13, in the invention according to Embodiment 12, further includes a basic compound as the additive for providing heat stability during molding in a total additive amount of 0.3 to 5.0 parts by weight based on 100 parts by weight of the polyvinyl chloride-based resin.

The invention according to Embodiment 14 provides a multilayered fire-resistant piping material including a tubular fire-resistant expandable layer made of a heat-expandable fire-resistant resin composition and a covering layer covering at least one of the outer surface and the inner surface of the fire-resistant expandable layer. The fire-resistant expandable layer is constituted of a fire-resistant resin composition containing heat-expandable graphite having an expansion volume in the range of 100 to 250 mL/g in an amount of 1 to 15 parts by weight based on 100 parts by weight of a polyvinyl chloride-based resin, and the covering layer is constituted of a polyvinyl chloride-based resin composition not containing heat-expandable fire-resistant materials, and the covering layer is constituted of a polyvinyl chloride-based resin composition not containing heat-expandable fire-resistant materials.

The invention according to Embodiment 15 provides a multilayered fire-resistant piping material including a tubular fire-resistant expandable layer formed of a heat-expandable fire-resistant resin composition and a covering layer covering at least one of the outer surface and the inner surface of the fire-resistant expandable layer. The fire-resistant expandable layer is constituted of a fire-resistant resin composition containing heat-expandable graphite having a 1.3-time expansion temperature of 180 to 240° C. in an amount of 1 to 15 parts by weight based on 100 parts by weight of a polyvinyl chloride-based resin, and the covering layer is constituted of a polyvinyl chloride-based resin composition not containing heat-expandable fire-resistant materials.

A multilayered fire-resistant piping material of the invention according to Embodiment 16, in the invention according to any one of Embodiments 9 to 15, when the piping material is constructed so as to pass through a flooring material and is subjected to a fire-resistant test (complying with ISO 834-1) in which the underside of the floor is heated under conditions that one end of the piping material is exposed to a heating side by 300 mm from the surface on the heating side of the flooring material and that the other end of the piping material is exposed to a non-heating side by 800 mm from the surface on the non-heating side of the flooring material, a pipe inner cross-sectional area S1 at the end of the piping material before burning on the heating side and a pipe inner cross-sectional area S2 at a minimum inner diameter of the piping material after burning satisfy a relationship:

$$(S2/S1) \times 100 \leq 50.$$

A multilayered fire-resistant piping material of the invention according to Embodiment 17, in the invention according to any one of Embodiments 9 to 16, the covering layer is provided on each of the outer surface and the inner surface of the fire-resistant expandable layer.

In the invention according to any of Embodiments 1 to 8, 1 to 10 parts by weight of heat-expandable graphite is blended with 100 parts by weight of a polyvinyl chloride-based resin. This is because that when the amount of the heat-expandable graphite is smaller than 1 part by weight, a sufficient heat expansibility cannot be obtained during burning, which causes insufficient caulking of the inside of a pipe, ascending of hot air through the inside of the pipe, and a decrease in fire-resistance performance. On the other hand, when the amount of the heat-expandable graphite is larger than 10 parts by weight, the heated composition is thermally expanded too much to maintain the shape, resulting in dropping of the residue to decrease the fire-resistance. Herein, the amount of the heat-expandable graphite is preferably 1 to 8 parts by weight and further preferably 2 to 7 parts by weight.

In the invention according to any of Embodiments 9 to 17, 1 to 15 parts by weight of heat-expandable graphite is blended with 100 parts by weight of a polyvinyl chloride-based resin. This is because that when the amount of the heat-expandable graphite is smaller than 1 part by weight, a sufficient heat expansibility cannot be obtained during burning, which causes insufficient caulking of the inside of a pipe, ascending of hot air through the inside of the pipe, and a decrease in fire-resistance performance. On the other hand, when the amount of the heat-expandable graphite is larger than 15 parts by weight, the heated composition is thermally expanded too much to maintain the shape, resulting in dropping of the residue to decrease the fire-resistance. Herein, the amount of the heat-expandable graphite is preferably 1 to 12 parts by weight and further preferably 2 to 10 parts by weight.

The heat-expandable graphite used in the present invention is a crystalline compound maintaining a layer structure of carbon and is obtained by acid treatment of a powder such as natural flake graphite, pyrolytic graphite, or Kish graphite by inserting an inorganic acid between layers of the graphite using an inorganic acid such as concentrated sulfuric acid, nitric acid, or selenic acid and a strong oxidant such as concentrated nitric acid, perchloric acid, perchlorate, permanganate, dichromate, or hydrogen peroxide.

The heat-expandable graphite having a pH of 1.5 to 4.0 is prepared by adjusting the pH after the acid treatment described above. The pH adjustment of the heat-expandable graphite is not particularly limited, but, in the state after acid treatment by inserting an inorganic acid between layers of raw material graphite as in above, the pH is usually 1 or less. Therefore, for example, the acid-treated graphite is washed with water for removing the remaining acid on the surface of the graphite, followed by drying. That is, the pH of the heat-expandable graphite can be increased by repeating washing with water and drying.

In the invention according to any of Embodiments 2 to 5 and Embodiments 10 to 13, heat-expandable graphite that is adjusted to acidic is used. This is because that the fire-resistance performance is improved by preventing burning by effectively carbonizing a polyvinyl chloride resin during burning. This is based on a property of a polyvinyl chloride-based resin that repeats a hydrogen chloride elimination reaction in the presence of an acid to generate a flame-retardant carbide. However, when the pH of heat-expandable graphite is lower than 1.5, the too strong acidity may, for example, cause corrosion of a molding apparatus. On the other hand, when the pH of heat-expandable graphite is higher than 4.0, the effect of accelerating the carbonization of a polyvinyl chloride-based resin is low, which may cause insufficient fire-resistance performance. Accordingly, it is determined to use heat-expandable graphite having a pH of 1.5 to 4.0.

Examples of the polyvinyl chloride-based resin used in the invention according to any of Embodiments 1 to 17 include polyvinyl chloride homopolymers; copolymers of vinyl chloride monomers and monomers having unsaturated bonds that are copolymerizable with the vinyl chloride monomers; and graft copolymers in which vinyl chloride is graft-copolymerized with (co)polymers other than vinyl chloride. These may be used alone or in a combination of two or more. In addition, the polyvinyl chloride-based resin may be chlorinated, according to need.

The monomers having unsaturated bonds that are copolymerizable with the vinyl chloride monomers are not particularly limited, and examples thereof include α-olefins such as ethylene, propylene, and butylene; vinyl esters such as vinyl acetate and vinyl propionate; vinyl ethers such as butylvinyl ether and cetylvinyl ether; (meth)acrylic acid esters such as methyl(meth)acrylate, ethyl(meth)acrylate, and butyl acrylate; aromatic vinyls such as styrene and α-methyl styrene; and N-substituted maleimides such as N-phenyl maleimide and N-cyclohexyl maleimide. These may be used alone or in a combination of two or more.

Any (co)polymer that can graft-(co)polymerize vinyl chloride can be used for graft-copolymerizing the vinyl chloride without particular limitation, and examples thereof include ethylene-vinyl acetate copolymers, ethylene-vinyl acetate-carbon monoxide copolymers, ethylene-ethyl acrylate copolymers, ethylene-butyl acrylate-carbon monoxide copolymers, ethylene-methyl methacrylate copolymers, ethylene-propylene copolymers, acrylonitrile-butadiene copolymers, polyurethane, polyethylene chloride, and polypropylene chloride. These may be used alone or in a combination of two or more.

The average degree of polymerization of the polyvinyl chloride-based resin is not particularly limited, but is preferably 400 to 1600 and most preferably 600 to 1400, since a low average degree of polymerization causes a decrease in physical properties of a molded article, and a high average degree causes an increase in melting viscosity to make molding difficult. In addition, the above-mentioned "average degree of polymerization" refers to an average degree of polymerization measured in conformity with JIS K-6721 "testing method for vinyl chloride resin" using a resin sample prepared by dissolving a composite vinyl chloride-based resin in tetrahydrofuran (THF), filtering the solution for removing insoluble components, and then removing the THF in the filtrate by drying.

The polymerization method of the polyvinyl chloride-based resin is not particularly limited. Any known polymerization method may be employed, and examples thereof include a bulk polymerization method, a solution polymerization method, an emulsion polymerization method, and a suspension polymerization method.

The chlorination method of the polyvinyl chloride-based resin is not particularly limited. Any known chlorination method may be employed, and examples thereof include thermal chlorination and photochlorination.

The polyvinyl chloride-based resin may be cross-linked or modified within the range that does not impair the fire-resistance performance as a resin composition. In such a case, a resin that is cross-linked or modified in advance may be used, or the cross-linking or modification may be simultaneously performed when an additive or other component is blended. Alternatively, the cross-linking or modification may be performed after blending of the additive or other component with the resin. The cross-linking of the resin may be performed by any method without particular limitation, and a usual cross-linking method of a polyvinyl chloride-based resin, such as cross-linking using various types of cross-linking agents or oxides, cross-linking by electron beam irradiation, or a method using a water cross-linking agent, may be employed.

In the invention according to Embodiment 4 or 12, the total additive amount of the group consisting of lead-based stabilizers, organic tin-based stabilizers, and higher fatty acid metal salts is 0.3 to 5.0 parts by weight based on 100 parts by weight of the polyvinyl chloride-based resin. This is because that when the total additive amount of the group consisting of lead-based stabilizers, organic tin-based stabilizers, and higher fatty acid metal salts is smaller than 0.3 parts by weight, the heat stability of the polyvinyl chloride-based resin is difficult to be ensured during molding, which may cause easy generation of carbides during molding. On the other hand, when the total additive amount of the group consisting of lead-based stabilizers, organic tin-based stabilizers, and higher fatty acid metal salts is larger than 5.0 parts by weight, the acceleration of the carbonization of the polyvinyl chloride-based resin during burning is inhibited, which may cause insufficient fire-resistance performance.

Examples of the lead-based stabilizers include white lead, basic lead sulfite, tribasic lead sulfate, dibasic lead phosphite, dibasic lead phthalate, tribasic lead maleate, a coprecipitate of silica gel and lead silicate, dibasic lead stearate, lead stearate, and lead naphthalate.

Examples of the organic tin-based stabilizers include mercaptides such as dibutyltin mercapto, dioctyltin mercapto, and dimethyltin mercapto; maleates such as dibutyltin maleate, dibutyltin maleate polymers, dioctyltin maleate, and dioctyltin maleate polymers; and carboxylates such as dibutyltin mercapto, dibutyltin laurate, and dibutyltin laurate polymers.

Examples of the higher fatty acid metal salts include lithium stearate, magnesium stearate, calcium stearate, calcium laurate, calcium ricinoleate, strontium stearate, barium stearate, barium laurate, barium ricinoleate, cadmium stearate, cadmium laurate, cadmium ricinoleate, cadmium naphthenate, cadmium 2-ethylhexanoate, zinc stearate, zinc laurate, zinc ricinoleate, zinc 2-ethylhexanoate, lead stearate, dibasic lead stearate, and lead naphthenate.

In the invention according to Embodiment 5 or 13, the amount of the basic compound is 0.3 to 5.0 parts by weight based on 100 parts by weight of the polyvinyl chloride-based resin. This is because that when the additive amount of the basic compound is smaller than 0.3 parts by weight, the heat stability of the polyvinyl chloride-based resin is difficult to be ensured during molding, which may cause easy generation of carbides during molding. On the other hand, when the additive amount of the basic compound is larger than 5.0 parts by weight, the acceleration of carbonization of the polyvinyl chloride-based resin during burning is inhibited, which may cause insufficient fire-resistance performance.

The basic compound is not particularly limited, and examples thereof include calcium carbonate, calcium silicate, calcium hydroxide, calcium oxide, magnesium carbonate, magnesium hydroxide, magnesium oxide, barium carbonate, aluminum hydroxide, zinc oxide, zinc hydroxide, and iron oxide.

In the invention according to Embodiment 6 or 14, the term "expansion volume of the heat-expandable graphite" refers to the volume per gram of heat-expandable graphite after heat expansion.

The expansion volume of heat-expandable graphite is determined by the following process:

1) One gram of a sample is put in a 500-cc. beaker that is heated in advance for 20 minutes or more in a heating furnace and is heated in the heating furnace (furnace temperature: 1000° C.);
2) After 30 seconds, the beaker is taken out from the heating furnace;
3) The sample in the beaker is cooled to room temperature;
4) The weight and the volume of the sample after expansion are measured; and
5) The value of (volume of the sample after expansion)/(weight of the sample after the expansion) is calculated.

The expansion volume of heat-expandable graphite varies depending on the type and amount of the interlayer compound of the heat-expandable graphite and on the particle diameter of the heat-expandable graphite itself, and is a very important factor for exhibiting fire-resistance.

In the invention according to Embodiment 6 or 14, the expansion volume of heat-expandable graphite is 100 to 250 mL/g. This is because that when the expansion volume of heat-expandable graphite is smaller than 100 mL/g, the expansion volume is too small to achieve sufficient fire-resistance, which requires a large amount of heat-expandable graphite for increasing the fire-resistance and may cause defects in, for example, physical properties or molding properties. On the other hand, when the expansion volume of heat-expandable graphite is larger than 250 mL/g, the heated composition is thermally expanded too much to maintain the shape, which may cause dropping of the residue and a decrease in the fire-resistance. Herein, the expansion volume of heat-expandable graphite is preferably 120 to 230 mL/g and more preferably 140 to 220 mL/g.

In the invention according to Embodiment 7 or 15, the 1.3-time expansion temperature of heat-expandable graphite is a temperature of a heating furnace when a sample of heat-expandable graphite is heated for 30 minutes in the furnace in which the temperature is kept constant and the expansion magnification of the sample is 1.3 times or more at the temperature.

In addition, expansion magnification is defined by (volume of sample after heating)/(volume of sample before heating).

The resin temperature during molding refers to the highest temperature of the resin during melting.

In the invention according to Embodiment 7 or 15, the 1.3-time expansion temperature of heat-expandable graphite is 180 to 240° C. This is because that when the 1.3-time expansion temperature of heat-expandable graphite is lower than 180° C., the heat-expandable graphite may expand during molding, which causes a defect in appearance of a pipe and also may decrease the fire-resistance during burning. On the other hand, when the 1.3-time expansion temperature of heat-expandable graphite is higher than 240° C., there is no risk of starting of expansion of the heat-expandable graphite during molding, but thermal decomposition (foaming) of the polyvinyl chloride-based resin progresses during burning. Therefore, since the heat-expandable graphite expands after a reduction in plasticity of the polyvinyl chloride-based resin, the polyvinyl chloride-based resin may not bear the expansion of the heat-expandable graphite to be broken to pieces.

The fire-resistant test in the invention according to Embodiment 8 or 16 is carried out according to an evaluation method of a performance test for pipe passing through, for example, a fireproof compartment, based on the revised Building Standards Act in force on Jun. 1, 2000 (Heisei 12). The flooring material used was PC (precast concrete) plate (length: 600 mm, width: 1200 mm, thickness: 100 mm), which is a flooring material of fireproof construction or semi-fireproof construction prescribed by the Building Standards Act.

Examples of the flooring material to be used include, in addition to the PC plate, the followings:

1) A wood frame member in which a gypsum board (thickness: 9.5 mm) is bonded to the upper surface of a structural plywood (thickness: 12 mm) and a reinforced gypsum board (thickness: 15 mm) is bonded to the lower surface of the plywood;

2) A wood frame member in which a gypsum board (thickness: 12.5 mm) is bonded to the upper surface of a structural plywood (thickness: 12 mm) and two reinforced gypsum boards (thickness: 12.5 mm) are bonded to the lower surface of the plywood;

3) A lightweight foamed concrete (ALC) plate having a thickness of 100 mm or more; and 4) A precast concrete (PC) plate having a thickness of 70 mm or more. In particular, the ALC plate and the PC plate having a thickness of 100 mm or more are preferred.

The gap between the piping material and the compartment pass-through portion was caulked with mortar. One end of the piping material was exposed to a heating side by 300 mm from the surface on the heating side of the flooring material, and the other end of the piping material was exposed to a non-heating side by 800 mm from the surface on the non-heating side of the flooring material.

The furnace used in the fire-resistant test had a structure that can heat one surface of a floor material and can almost uniformly give a temporal change in temperature based on the following Expression 1 complying with regulation of ISO 834-1 to all over the entire test surface of the floor material, when the surface on the heating side of the floor material was the test surface.

That is, the fire-resistant test furnace was provided with a thermocouple (hereinafter, referred to as "furnace thermocouple") for measuring temperature in the furnace at a position apart from the floor material by 100 to 300 mm such that one to ten hot junctions were arranged uniformly with respect to the test surface of the floor material.

Then, according to the regulation of ISO 834-1, the fire-resistant test furnace was heated so that the temporal change in temperature (hereinafter, referred to as "heating temperature") measured by the thermocouple can be expressed by a numerical value represented by the following Expression 1:

$$T=345 \log_{10}(8t+1)+20 \quad \text{(Expression 1)}$$

In Expression 1, T denotes an average temperature (° C.) in the furnace, and t denotes elapsed time (minute) in the test, and the temperature was measured within every one minute period.

Regarding the pipe inner cross-sectional area S1 at the end on the heating side of the piping material before burning, the piping material is measured for inner diameters at least in two directions before starting of the fire-resistance test to calculate the average inner diameter, and then the pipe inner cross-sectional area S1 is calculated.

Regarding the pipe inner cross-sectional area S2 at the minimum inner diameter portion of the piping material after burning, after starting of the fire-resistance test, when smoke appears from the gap between the compartment pass-through portion and the piping material on the non-heating side, the burning in the fire-resistant test furnace is terminated, and then the flooring material panel is immediately removed from the fire-resistant furnace. After cooling of the pipe, the caulked pipe is observed from the heating side to determine the projected area S2 thereof. The S2 may be measured by any method such as the followings:

a method by image analysis of a photograph taken from the heating side, or a method by sketching a projected portion on a paper, cutting out the sketched portion and weighing the cut-out paper, and determining the S2 by proportional calculation based on the weight of the paper of which weight per unit area is already known.

When no smoke was observed for 2 hours, the test is terminated after 2 hours, and the S2 is measured by the above-mentioned process.

In the invention according to Embodiment 8 or 16, the value obtained by the Expression of (S2/S1)×100 represents a pipe inner cross-sectional area proportion (%) after burning. In the invention according to Embodiment 8 or 16, the pipe inner cross-sectional area proportion is 50% or less. This is because that when the pipe inner cross-sectional area proportion is larger than 50%, the pass-through portion in a pipe after burning cannot be effectively caulked, which may not give a desired fire-resistance performance.

In the invention according to any of Embodiments 1 to 17, additives, such as a flame retardant, a stabilizer, a lubricant, a processing aid, an impact modifier, a heat-resistance-improving agent, an antioxidant, a light stabilizer, an ultraviolet absorber, a pigment, a plasticizer, and a thermoplastic elastomer, may be added within a range that does not impair the physical properties.

As the flame retardant, any flame retardant that increases flame retardancy during burning can be used without particular limitation, and examples thereof include hydroxides such as aluminum hydroxide and magnesium hydroxide; hydrotalcite; antimony oxides such as antimony dioxide, antimony trioxide, and antimony pentoxide; molybdenum compounds such as molybdenum trioxide, molybdenum disulfide, and ammonium molybdate; bromine-based compounds such as tetrabromobisphenol A, tetrabromethane, tetrabromethane, tetrabromethane, and tetrabromethane; phosphorus-based compounds such as triphenyl phosphate and ammonium polyphosphate; calcium borate; and zinc borate. From the viewpoint of the effect of preventing burning of polyvinyl chloride, antimony trioxide is particularly preferred, because antimony compounds generate halogenated antimony compounds in the presence of halogenated compounds under high temperature conditions and prevent a burning cycle with a very high effect, and the synergetic effect thereof is significant.

By using the flame retardant, the synergetic effect between the heat-insulating effect by the expansion of heat-expandable graphite and the flame-retarding effect by the flame retardant can more efficiently improve the fire-resistance performance during burning. The additive amount of the flame retardant is not particularly limited, but is preferably 1 part by weight or more and 20 parts by weight or less based on 100 parts by weight of the polyvinyl chloride-based resin. When the amount of the flame retardant is less than 1 part by weight, sufficient synergetic effect may not be obtained. When the amount of the flame retardant is higher than 20 parts by weight, the molding properties and the physical properties may be significantly decreased.

The stabilizer is not particularly limited, and examples thereof include heat stabilizers and heat stabilization aids. The heat stabilizers are not particularly limited, and example thereof include organic tin-based stabilizers such as dibutyltin mercapto, dioctyltin mercapto, dimethyltin mercapto, dibutyltin mercapto, dibutyltin maleate, dibutyltin maleate polymers, dioctyltin maleate, dioctyltin maleate polymers, dibutyltin laurate, and dibutyltin laurate polymers; lead-based stabilizers such as lead stearate, dibasic lead phosphate, and tribasic lead sulfate; calcium-zinc-based stabilizers; barium-zinc-based stabilizers; and barium-cadmium-based stabilizers. These may be used alone or in a combination of two or more.

The heat stabilization aids are not particularly limited, and examples thereof include epoxidized soybean oil, phosphate esters, polyols, hydrotalcite, and zeolite. These may be used alone or in a combination of two or more.

The lubricant includes an inner lubricant and an outer lubricant.

The inner lubricant is used for reducing the fluid viscosity of a melting resin during a molding process to prevent friction heat generation. The inner lubricant is not particularly limited, and examples thereof include butyl stearate, lauryl alcohol, stearyl alcohol, epoxidized soybean oil, glycerin monostearate, stearic acid, and bisamides. These may be used alone or in a combination of two or more.

The outer lubricant is used for accelerating sliding effect between a melting resin and a metal surface during a molding process. The outer lubricant is not particularly limited, and examples thereof include paraffin wax, polyolefin wax, ester wax, and montanoic acid wax. These may be used alone or in a combination of two or more.

The processing aid is not particularly limited, and examples thereof include acryl-based processing aids such as alkyl acrylate-alkyl methacrylate copolymers having a weight average molecular weight of 100000 to 2000000. The acryl-based processing aids are not particularly limited, and examples thereof include n-butyl acrylate-methyl methacrylate copolymers and 2-ethylhexyl acrylate-methyl methacrylate-butyl methacrylate copolymers. These may be used alone or in a combination of two or more.

The impact modifier is not particularly limited, and examples thereof include methyl methacrylate-butadiene-styrene (MBS) copolymers, polyethylene chloride, and acrylic rubber.

The heat-resistance-improving agent is not particularly limited, and examples thereof include α-methylstyrene-based and N-phenylmaleimide-based resins.

The antioxidant is not particularly limited, and examples thereof include phenol-based antioxidants.

The light stabilizer is not particularly limited, and examples thereof include hindered amine light stabilizers.

The ultraviolet absorber is not particularly limited, and examples thereof include salicylic acid ester-based, benzophenone-based, benzotriazole-based, and cyanoacrylate-based ultraviolet absorbers.

The pigment is not particularly limited, and examples thereof include organic pigments such as azo-based, phthalocyanine-based, surene-based, and dye lake-based pigments; and inorganic pigments such as oxide-based, molybdenum chromate-based, sulfide/selenide-based, and ferrocyanide-based pigments.

The polyvinyl chloride-based resin may contain a plasticizer, but since the plasticizer may decrease the heat-resistance and fire-resistance of a molded article, the amount thereof is preferably small.

The plasticizer is not particularly limited, and examples thereof include dibutyl phthalate, di-2-ethylhexyl phthalate, and di-2-ethylhexyl adipate.

The thermoplastic elastomer is not particularly limited, and examples thereof include acrylnitrile-butadiene (NBR) copolymers, ethylene-vinyl acetate (EVA) copolymers, ethylene-vinyl acetate-carbon monoxide (EVACO) copolymers, vinyl chloride-based thermoplastic elastomers such as vinyl chloride-vinyl acetate copolymers and vinyl chloride-vinylidene chloride copolymers, styrene-based thermoplastic elastomers, olefin-based thermoplastic elastomers, urethane-based thermoplastic elastomers, polyester-based thermoplastic elastomers, and polyamide-based thermoplastic elastomers. These thermoplastic elastomers may be used alone or in a combination of two or more.

The method for mixing the additives with the polyvinyl chloride-based resin is not particularly limited, and examples thereof include a method by hot-blending and a method by cold blending.

Examples of the fire-resistant piping material of the present invention include fire-resistant pipes and fire-resistant pipe joints. Furthermore, the fire-resistant piping material of the present invention is molded with an extruder or an injection molder that is usually used. The type and the screw shape of the molder are not particularly limited as long as sufficient kneading can be performed, considering the tensile strength and the impact, and an extruder allowing continuous molding is preferred.

Since the single-layered fire-resistant piping material of the invention according to Embodiment 1 is constituted of a fire-resistant resin composition containing heat-expandable graphite in an amount of 1 to 10 parts by weight based on 100 parts by weight of a polyvinyl chloride-based resin, the molding properties thereof are excellent. For example, the piping material can be continuously produced with high size accuracy using an extruder, an injection molder, or the like.

Furthermore, since the polyvinyl chloride-based resin is self-extinguishing, the burning rate is effectively reduced, and thereby the flame propagation velocity during burning can be suppressed. In addition, since the resin forms foam in the beginning of burning, an advantage that the heat-expandable graphite readily expands is also provided.

Furthermore, since heat-expandable graphite itself hardly burns and thereby exhibits a heat-insulating effect by being expanded by heat, the burning rate is further effectively reduced.

Therefore, the single-layered fire-resistant piping material of the present invention has excellent fire-resistance and expansibility in itself and thereby can prevent flame and smoke from penetrating to the other side partitioned by the compartment pass-through portion by the expansion of the piping material itself during burning and the effect of reducing burning rate.

The single-layered fire-resistant piping material of the invention according to Embodiment 2 includes a fire-resistant expandable layer made of a fire-resistant resin composition containing heat-expandable graphite having a pH of 1.5 to 4.0 in an amount of 1 to 10 parts by weight based on 100 parts by weight of a polyvinyl chloride-based resin, and thereby has the following excellent effects.

That is, since the single-layered fire-resistant piping material of the invention contains heat-expandable graphite having a PH of 1.5 to 4.0, during burning, not only the acid disposed between layers of the heat-expandable graphite but also the acid remaining on the surface of the heat-expandable graphite are discharged. Therefore, the amount of discharged acid is larger than that of the neutralized heat-expandable graphite, and an elimination reaction of hydrogen chloride from the polyvinyl chloride-based resin is accelerated. Consequently, the polyvinyl chloride-based resin during burning can be effectively carbonized. As a result, during burning, the residue formed by the expanded heat-expandable graphite and the carbide of the polyvinyl chloride-based resin that strongly entwining with each other can reliably caulk the end of the pipe on the heating side.

In addition, since the heat-expandable graphite has a pH in the range of 1.5 to 4.0, there is no risk of damaging a molding apparatus for molding the piping material.

In the invention according to Embodiment 3, in the invention according to Embodiment 2, since the fire-resistant resin composition in Embodiment 2 contains an additive for providing heat stability during molding, the elimination reaction of hydrogen chloride from the polyvinyl chloride-based resin during molding is suppressed to prevent the resin from being deteriorated and carbonized during molding.

In the invention according to Embodiment 4, in the invention according to Embodiment 3, the additive for providing heat stability during molding contains at least one selected from the group consisting of lead-based stabilizers, organic tin-based stabilizers, higher fatty acid metal salts, and basic compounds in a total additive amount of 0.3 to 5.0 parts by weight based on 100 parts by weight of the polyvinyl chloride-based resin. Therefore, the deterioration and carbonization of the resin during molding can be prevented by suppressing the elimination reaction of hydrogen chloride from the polyvinyl chloride-based resin during molding by any of the following actions 1) to 4):

1) capture and neutralization of hydrogen chloride;
2) substitution with chlorine atoms;
3) capture and inactivation of radicals; and
4) isolation of conjugate double bond.

Furthermore, since the lead-based stabilizers, organic tin-based stabilizers, and higher fatty acid metal salts are further excellent in heat stability during molding, compared to other additives that provide heat stability during molding, the product yield is high, and also the long-running continuous operation in extrusion molding is excellent.

In addition, the lead-based stabilizers, the organic tin-based stabilizers, and the higher fatty acid metal salts provide high molding stability even if the amount thereof is small. Therefore, since the additive amounts of these additives, based on the amount of the polyvinyl chloride-based resin, may be smaller than those of other additives that provide heat stability during molding, the tensile strength and fire-resistance of a pipe are hardly decreased.

In the invention according to Embodiment 5, in the invention according to Embodiment 4, a basic compound is further contained as the additive for providing heat stability during molding in a total additive amount of 0.3 to 5.0 parts by weight based on 100 parts by weight of the polyvinyl chloride-based resin. Therefore, the heat stability during molding and the tensile strength and fire-resistance of a pipe can be further reliably ensured.

Since the single-layered fire-resistant piping material of the invention according to Embodiment 6 is constituted of a fire-resistant resin composition containing heat-expandable graphite having an expansion volume in the range of 100 to 250 mL/g in an amount of 1 to 10 parts by weight based on 100 parts by weight of the polyvinyl chloride-based resin, the heat-expandable graphite effectively expands during burning, and the piping material is excellent in maintaining the shape of the residue. Furthermore, the polyvinyl chloride-based resin repeats de-hydrochloric acid to accelerate carbonization of the polyvinyl chloride-based resin. As a result, strong residue is formed, and excellent effect of reducing the burning rate is obtained by the synergetic effect with the heat-expandable graphite.

Since the single-layered fire-resistant piping material of the invention according to Embodiment 7 is constituted of a fire-resistant resin composition containing heat-expandable graphite having a 1.3-time expansion temperature of 180 to 240° C. in an amount of 1 to 10 parts by weight based on 100 parts by weight of the polyvinyl chloride-based resin, melting/thermal decomposition (foaming) of the polyvinyl chloride-based resin do not progress even if the heat-expandable graphite has reached the 1.3-time expansion temperature, and the elongation viscosity of the polyvinyl chloride-based resin is maintained. Therefore, the polyvinyl chloride-based resin effectively extends according to the expansion of the heat-expandable graphite to form a fire-resistant expandable layer. Since the polyvinyl chloride-based resin is subsequently carbonized, highly excellent fire-resistance can be provided even if the amount of the heat-expandable graphite is small.

In the single-layered fire-resistant piping material of the invention according to Embodiment 8, in the invention according to any one of Embodiments 1 to 7, when the piping material is constructed so as to pass through a flooring material and is subjected to a fire-resistant test (complying with ISO 834-1) in which the underside of the floor is heated under the conditions that one end of the piping material is exposed to a heating side by 300 mm from the surface on the heating side of the flooring material and that the other end of the piping material is exposed to a non-heating side by 800 mm from the surface on the non-heating side of the flooring material, a pipe inner cross-sectional area $S1$ at the end of the piping material before burning on the heating side and a pipe inner cross-sectional area $S2$ at a minimum inner diameter of the piping material after burning satisfy a relationship of $(S2/S1) \times 100 \leq 50$. Therefore, the pipe inner cross-sectional area during burning becomes 50% or less of the pipe inner cross-sectional area $S1$ before the burning.

As a result, when the single-layered fire-resistant piping material of the present invention is installed so as to pass through the floor, even if the underside of the floor is heated to 1000° C. or more, the residue does not drop from the underside of the floor so that a state that the pipe is almost caulked continues for a long period of time. That is, a reduction in the pipe inner cross-sectional area during burning can prevent heat from ascending in the pipe and suppress an increase in temperature of the piping material on the non-heating side with respect to the floor. Therefore, the piping material is inhibited from burning out, and smoke generation on the non-heating side, due to a gap with a mortar interface generated by softening of the piping material, can be prevented, resulting in improvements in flame shielding performance, heat shielding performance, and smoke shielding performance.

Thus, the single-layered fire-resistant piping material of the invention according to any of Embodiments 1 to 8 has excellent fire-resistance and expansibility in itself and thereby can prevent flame and smoke from penetrating to the other side partitioned by the compartment pass-through portion by the expansion of the piping material itself during burning and the reduction in burning rate. Therefore, it is not necessary to dispose other fire-resistant member, which is necessary in the conventional way, around the piping material.

Furthermore, processes such as marking for confirming positions are unnecessary in temporary pipe fitting during construction, and the single-layered fire-resistant piping material is simply inserted into the compartment pass-through portion. Consequently, the work is considerably reduced, and the workability in the construction site is dramatically improved.

Furthermore, in the single-layered fire-resistant piping material of the present invention, the pipe outer diameter is smaller than that of a so-called fire-resistant double-layered pipe in which fiber-reinforced mortar covers the outer circumference of the pipe made of a vinyl chloride resin. Therefore, when a plurality of through-holes is provided, the distances among the through-holes can be small, and also when the pipe is installed under the floor, slope can be easily obtained. Thus, workability is dramatically improved.

The multilayered fire-resistant piping material of the invention according to any of Embodiments 9 to 16 includes a covering layer formed of a polyvinyl chloride-based resin composition not containing heat-expandable graphite on at least one of the outer surface and the inner surface of the fire-resistant expandable layer. Therefore, in addition to the effects of the invention according to any of Embodiments 1 to 8, the multilayered fire-resistant piping material is further excellent in the molding properties and can be continuously produced with high size accuracy by, for example, injection molding or extrusion molding.

Furthermore, the fire-resistant expandable layer contains a polyvinyl chloride-based resin as a main component and thereby has sufficient mechanical strength and chemical proof necessary as a piping material.

In addition, since the base resins of both the fire-resistant expandable layer and the covering layer constituting the piping material are polyvinyl chloride-based resins, the affinity between the layers is high. Therefore, the layers are tightly adhered to each other at the interface, resulting in providing of excellent water cutoff performance. Consequently, when the multilayered fire-resistant piping materials of the present invention are connected to each other with a pipe joint, the treatment of the end of the piping material is unnecessary, resulting in dramatic improvement in construction workability.

When the outer surface of the fire-resistant expandable layer is covered with a covering layer formed of a polyvinyl chloride-based resin composition not containing a heat-expandable fire-resistant material, the outer circumference surface of the piping material is excellent in adhesion and, for example, can be easily and reliably connected to another member such as a pipe joint.

When the inner surface of the fire-resistant expandable layer is covered with a covering layer formed of polyvinyl chloride-based resin composition not containing a heat-expandable fire-resistant material, the inner circumference surface of the piping material is smooth to allow fluid to smoothly pass. In addition, since the inner circumference surface of the piping material is excellent in chemical proof, the piping material hardly limits the type of fluid, which allows general purpose application.

Since the multilayered fire-resistant piping material of the invention according to Embodiment 17, in the invention according to any one of Embodiments 9 to 16, includes the covering layer on each of the outer surface and the inner surface of the fire-resistant expandable layer, the outer circumference surface of the piping material is excellent in adhesion and, for example, can be easily and reliably connected to another member such as a pipe joint, and also the inner circumference surface of the piping material is excellent in chemical proof, and thereby the piping material hardly limits the type of fluid, which allows general purpose application.

BEST MODES FOR CARRYING OUT THE INVENTION

Figure 1:
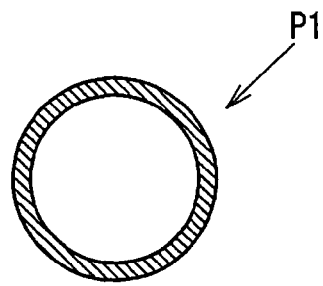
FIG. 1 is a cross-sectional view of a single-layered fire-resistant piping material P1 according to an embodiment of the present invention.

A single-layered fire-resistant piping material P1 of a first embodiment according to the present invention is composed of a fire-resistant resin composition alone, as shown in FIG. 1.

The present invention will be described in detail with reference to examples below.

In Examples 1 to 16 and Comparative Examples 1 to 5, the following materials were used:

Vinyl chloride resin (manufactured by Taiyo Vinyl Corp., trade name: "TH1000");

Heat-expandable graphite (manufactured by Tosoh Corp., trade name: "GREP-EG");

Calcium carbonate (manufactured by Shiraishi Calcium Kaisha, Ltd., trade name: "Whiton SB");

Lead-based stabilizer (manufactured by Sakai Chemical Industry Co., Ltd., trade name: "SL-1000"); and Lubricant (manufactured by Mitsui Chemicals, Inc., trade name: "Hiwax 4202E").

In Examples 17 to 41 and Comparative Examples 6 to 15, the following materials were used:

Vinyl chloride resin (manufactured by Tokuyama Sekisui Co., Ltd, trade name: "TS1000R");

Heat-expandable graphite (manufactured by Chuetsu Graphite Works Co., Ltd., trade name: "SFF");

Lead-based stabilizer: lead stearate (manufactured by Mizusawa Industrial Chemicals, Ltd., trade name: "StabinexNC18");

Organic tin-based stabilizer: octyltin mercapto (manufactured by Sankyo Organic Chemicals Co., Ltd., trade name: "ONE-100F");

Higher fatty acid metal salt: Ca/Zn-based composite stabilizer (manufactured by Sakai Chemical Industry Co., Ltd., trade name: "NWP-6000");

Basic compound: calcium carbonate (manufactured by Shiraishi Calcium Kaisha, Ltd., trade name: "Whiton SB"), magnesium hydroxide (manufactured by Kyowa Chemical Industry Co., Ltd., trade name: "KISUMA5A");

Hydrotalcite (manufactured by Kyowa Chemical Industry Co., Ltd., trade name: "DHT-4A");

Epoxidized soybean oil (manufactured by ADEKA Corp., trade name: "Adekacizer 0130P"); and Lubricant (manufactured by Mitsui Chemicals Inc., trade name: "Hiwax 4202E").

The pH of the heat-expandable graphite was confirmed by the following method:

1) A graphite mixture is prepared by adding 25 mL of ion-exchange water to 5 g of a heat-expandable graphite sample;

2) The resulting graphite mixture is stirred with a glass rod for 30 seconds; and 3) After leaving the solution for 20 minutes, the pH of the graphite mixture is measured with a pH meter (manufactured by Horiba, Ltd., trade name: "pH/ION METER F-23").

The pH of the heat-expandable graphite was adjusted by the following method:

The heat-expandable graphite was put in a beaker, and ion exchange water was added thereto, followed by stirring. The acid remaining on the surface of the heat-expandable graphite was removed by washing, while the pH of the graphite mixture was confirmed with the pH meter. Then, the graphite mixture was filtered, followed by drying in a thermostatic chamber to give heat-expandable graphite having a desired pH: When a desired pH was not obtained by washing once, the washing and drying processes were repeated.

In Examples 42 to 57 and Comparative Examples 16 to 18, the following materials were used:

Vinyl chloride resin (manufactured by Tokuyama Sekisui Co., Ltd., trade name: "TS1000R");

Heat-expandable graphite (expansion volume: 65 mL/g): (manufactured by Sanyo Trading Co., Ltd., trade name: "SYZR1003");

Heat-expandable graphite (expansion volume: 100 mL/g): (grain size-controlled product);

Heat-expandable graphite (expansion volume: 150 mL/g): (manufactured by Sanyo Trading Co., Ltd., trade name: "SYZR1002");

Heat-expandable graphite (expansion volume: 180 mL/g): (manufactured by Chuetsu Graphite Works Co., Ltd., trade name: "SFF");

Heat-expandable graphite (expansion volume: 190 mL/g): (manufactured by Sanyo Trading Co., Ltd., trade name: "SYZR502");

Heat-expandable graphite (expansion volume: 200 mL/g): (manufactured by Sanyo Trading Co., Ltd., trade name: "SYZR802");

Heat-expandable graphite (expansion volume: 250 mL/g): (grain size-controlled product);

Heat-expandable graphite (expansion volume: 275 mL/g): (manufactured by Sanyo Trading Co., Ltd., trade name: "SYZR322");

Calcium carbonate (manufactured by Shiraishi Calcium Kaisha, Ltd., trade name: "Whiton SB");

Organic tin-based stabilizer (manufactured by Sankyo Organic Chemicals Co., Ltd., trade name: "ONZ-142F");

Lubricant (manufactured by Mitsui Chemicals Inc., trade name: "Hiwax 220 MP"); and Stearic acid (manufactured by Kao Corp., trade name: "S-30").

In Examples 58 to 70 and Comparative Examples 19 and 20, the following materials were used:

Vinyl chloride resin (manufactured by Tokuyama Sekisui Co., Ltd., trade name: "TS1000R");

Heat-expandable graphite (manufactured by Chuetsu Graphite Works Co., Ltd., trade name: "SFF", expansion volume: 180 mL/g);

Calcium carbonate (manufactured by Shiraishi Calcium Kaisha, Ltd., trade name: "Whiton SB");

Lead-based stabilizer (manufactured by Sakai Chemical Industry Co., Ltd., trade name: "SL-1000"); and Lubricant (manufactured by Mitsui Chemicals Inc., trade name: "Hiwax 4202E").

In Examples 71 to 75 and Comparative Examples 21 and 22, the following materials were used:

Vinyl chloride resin (manufactured by Taiyo Vinyl Corp., trade name: "TH1000");

Heat-expandable graphite (1.3-time expansion temperature-controlled product);

Lead-based stabilizer (manufactured by Sakai Chemical Industry Co., Ltd., trade name: "SL-1000"); and Lubricant (manufactured by Mitsui Chemicals Inc., trade name: "Hiwax 4202E").

Then, the above-mentioned materials were mixed at ratios shown in Tables 1 to 14, and each mixture was stirred and mixed in a Henschel mixer having a capacity of 200 liters (manufactured by Kawada Industries, Inc.) to give a resin composition. The resulting resin composition was extrusion molded with a generally used extruder to a test piping material P to be used for fire-resistance evaluation. The resin temperature during molding for those that are not shown in the Tables was 180° C.

As shown in FIG. 1, the test piping material P was formed so as to have a length of 1200 mm, an outer diameter of 114 mm, a thickness of 6.6 mm, and a nominal diameter of 100 mm.

Furthermore, test pieces to be used for performance evaluation and heat expansibility evaluation were produced from the test piping material P by cutting out a part of the pipe wall of the test piping material P, press-molding the cut-out pipe wall with a load of 200 kgf at 190° C. for 3 minutes to a press plate having a thickness of 3 mm, and cutting the press plate into 1-cm square pieces.

Figure 2:
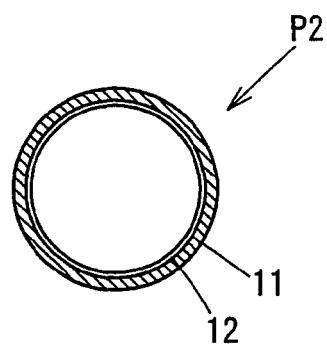
FIG. 2 is a cross-sectional view of a multilayered fire-resistant piping material P2 according to an embodiment of the present invention.

A multilayered fire-resistant piping material P2 of a second embodiment according to the present invention is constituted of a fire-resistant expandable layer 11 and an inner side covering layer 12 covering the inner circumference surface of the fire-resistant expandable layer 11, as shown in FIG. 2.

Figure 3:
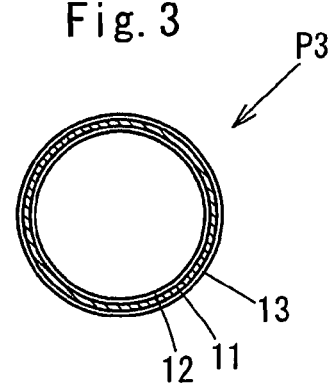
FIG. 3 is a cross-sectional view of a multilayered fire-resistant piping material P3 according to an embodiment of the present invention.

A multilayered fire-resistant piping material P3 of a third embodiment according to the present invention is constituted of a fire-resistant expandable layer 11, an inner side covering layer 12 covering the inner circumference surface of the fire-resistant expandable layer 11, and an outer side covering layer 13 covering the outer circumference surface of the fire-resistant expandable layer 11, as shown in FIG. 3.

Figure 4:
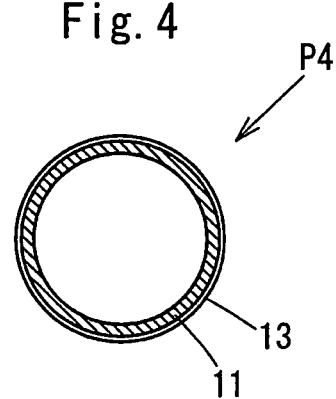
FIG. 4 is a cross-sectional view of a multilayered fire-resistant piping material P4 according to an embodiment of the present invention.

Furthermore, a multilayered fire-resistant piping material P4 of a fourth embodiment according to the present invention is constituted of a fire-resistant expandable layer 11 and an outer side covering layer 13 covering the outer circumference surface of the fire-resistant expandable layer 11, as shown in FIG. 4.

The present invention will be described in detail with reference to Examples below.

In Examples 76 to 98 and Comparative Examples 23 to 32, the following materials were used:

Vinyl chloride resin (manufactured by Taiyo Vinyl Corp., trade name: "TH1000");

Heat-expandable graphite (manufactured by Tosoh Corp., trade name: "GREP-EG", 1.3-time expansion temperature: 210° C.);

Lead-based stabilizer (manufactured by Sakai Chemical Industry Co., Ltd., trade name: "SL-1000");

Lubricant (manufactured by Mitsui Chemicals, Inc., trade name: "Hiwax 4202E");

Calcium carbonate (Shiraishi Calcium Kaisha, Ltd., trade name: "Whiton SB"); and Ammonium polyphosphate (Sumitomo Chemical Co., Ltd., trade name: "Sumisafe P").

Examples 99 to 120 and Comparative Examples 33 to 35

Vinyl chloride resin (manufactured by Taiyo Vinyl Corp., trade name: "TH1000");

Heat-expandable graphite (1.3-time expansion temperature-controlled product);

Lead-based stabilizer (manufactured by Sakai Chemical Industry Co., Ltd., trade name: "SL-1000");

Lubricant (manufactured by Mitsui Chemicals, Inc., trade name: "Hiwax 4202E"); and Calcium carbonate (manufactured by Shiraishi Calcium Kaisha, Ltd., trade name: "Whiton SB").

Then, the resulting resin composition was extrusion molded with a generally used extruder to a test piping material P to be used for fire-resistance evaluation. The resin temperature during molding for those that are not shown in the Tables was 190° C.

The test piping material P was formed so as to have a length of 1200 mm, an outer diameter of 114 mm, a thickness of 6.6 mm, and a nominal diameter of 100 mm. The thicknesses of the fire-resistant expandable layer 11, the inner side covering layer 12, and the outer side covering layer 13 were adjusted to those shown in Tables 15 to 20.

Furthermore, test pieces to be used for performance evaluation and heat expansibility evaluation were produced from the test piping material P by cutting out a part of the pipe wall of the test piping material P, press-molding the cut-out pipe wall with a load of 200 kgf at 190° C. for 3 minutes to a press plate having a thickness of 3 mm, and cutting the press plate into 1-cm square pieces.

Fire-Resistance Evaluation

Figure 5:
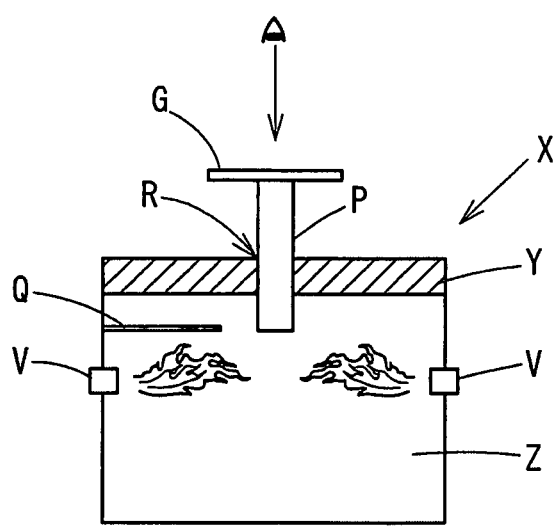
FIG. 5 is an explanatory drawing simply showing a structure of a fire-resistant test furnace X used in a fire-resistant test.

A fire-resistance test (an evaluation method of fire-resistance performance test of the revised Building Standards Act in force on Jun. 1, 2000 (Heisei 12), complying with ISO 834-1) was performed using the fire-resistant test furnace X shown in FIG. 5.

As the floor material Y, a precast concrete plate (length: 1200 mm, width: 600 mm, thickness: 100 mm) was used. As the fireproof construction method, the gap between the test piping material P and the compartment pass-through portion R was caulked with mortar.

Furthermore, one end of the test piping material P was exposed to the heating side by 300 mm from the surface on the heating side of the flooring material Y, and the other end of the test piping material P was exposed to the non-heating side by 800 mm from the surface on the non-heating side of the flooring material Y.

The inner side wall of the heating chamber Z of the fire-resistant test furnace X was provided with burners V, V. In addition, in the inside of the heating chamber Z, two hot junctions of a furnace thermocouple Q were installed at positions apart from the flooring material Y by 300 mm so as to be evenly arranged with respect to the test surface of the flooring material. Furthermore, the fire-resistant test furnace X was equipped with an apparatus (not shown) for measuring pressure in the furnace.

The period of time (smoke-generating time) after the start of heating until the appearance of smoke from the gap between the compartment pass-through portion R and the test piping material P was measured. The appearance of smoke was visually determined. A test piece of which smoke-generating time was 130 minutes or more was determined as ◉ (excellent), a test piece of 120 minutes or more was determined as ○ (acceptance), a test piece of 75 minutes or more was determined as Δ, and a test piece of shorter than 75 minutes was determined as x (rejection).

The pipe inner cross-sectional area proportion was determined as follows:

First, the fire-resistant test furnace X was heated so that the temporal change in heating temperature could be expressed by a numerical value represented by the aforementioned Expression 1.

Then, the burning of the test piping material P was visually observed through the observation window G, and when smoke was observed from the gap between the compartment pass-through portion R and the test piping material P, the burning of the fire-resistant test furnace X was terminated.

Figure 6:
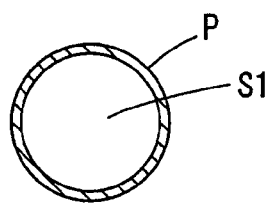
FIG. 6 is an explanatory drawing showing a pipe inner cross-sectional area S1 of a piping material P, before burning, of the invention according to Embodiment 8 or 16.
Figure 7:
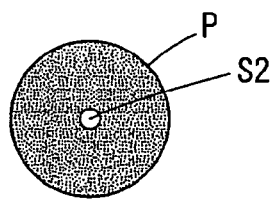
FIG. 7 is an explanatory drawing showing a pipe inner cross-sectional area S2 of the piping material P, after burning, of the invention according to Claim Embodiment 8 or 16.

Then, the degree of caulking of the inside of the test piping material P after burning was calculated as the pipe inner cross-sectional area proportion after burning by the following calculation expression using a pipe inner cross-sectional area S1 at the end of the test piping material P, before burning, on the heating side as shown in FIG. 6 and a pipe inner cross-sectional area S2 at a minimum inner diameter of the test piping material P after burning as shown in FIG. 7.

Pipe inner cross-sectional area proportion after burning=$(S2/S1) \times 100$.

Herein, the pipe inner cross-sectional area S1 was determined by measuring inner diameters of a piping material in two directions (orthogonal to each other) before the start of the fire-resistance test and calculating the average inner diameter.

Regarding the pipe inner cross-sectional area S2 at a minimum inner diameter of the piping material after burning, when smoke appeared on the non-heating side from the gap between the compartment pass-through portion and the piping material after the starting of the fire-resistant test, the burning of the fire-resistant test furnace was terminated, and then the flooring material panel was immediately removed from the fire-resistant furnace. After cooling the pipe, the caulked pipe was observed from the heating side to determine the projected area as the S2.

In the measurement of S2, the minimum inner diameter portion in the pipe was sketched on a paper from a photograph taken from the heating side, the sketched portion was cut out and measured the weight thereof, and the S2 was proportionally calculated on the basis of the weight and the area of the paper that were already known.

Regarding the elongated length L of the residue, when smoke appeared on the non-heating side from the gap between the compartment pass-through portion and the piping material after the start of the fire-resistant test, the burning of the fire-resistant test furnace was terminated, and then the flooring material panel was immediately removed from the fire-resistant furnace. After cooling of the pipe, the elongated length L orthogonal to the surface on the heating-side of the flooring material was measured.

When no smoke was observed for 2 hours, the fire-resistant test was terminated after 2 hours, and the pipe inner cross-sectional area S2 and the elongated length L of the residue were measured by the above-mentioned processes.

Performance Evaluation

The resulting test pieces were subjected to a tensile test (evaluation temperature: 23° C.) regulated in JIS K7113 for determining whether performance required as a pipe is satisfied.

In order to determine whether practical performance required as a pipe is satisfied, a test piece having a tensile strength of 45 MPa or more at 23° C. was determined as ◉ (excellent), a test piece of 30 MPa or more was determined as ○ (acceptance), and a test piece of less than 30 MPa was determined as x (rejection).

Molding Property Evaluation

A sample that could be extrusion molded and had a satisfactory pipe appearance in appearance visual observation was determined as ○ (acceptance), and a sample that could not be extrusion molded was determined as x (rejection). A sample that had abnormality in pipe appearance was determined as Δ.

Apparatus Corrosive Evaluation

After conducted manufacturing for three hours, the apparatus was left for three days. Then, the metal hopper portion of the raw material feeding portion was visually observed for investigating the degree of corrosion. When no abnormality was observed, it was determined as ○ (acceptance), and when red rust was observed, it was determined as x (rejection).

Extrusion Molding Stability Evaluation

During continuous operation for three hours, the resin composition discharged from the tip of an extruder was visually confirmed. A case of no carbonization and no burning (yellowing), it was determined as ◉ (excellent), a case of no carbonization, it was determined as ○ (acceptance), and a case of carbonization, it was determined as x (rejection).

Heat Expansibility Evaluation

The test pieces were subjected to a fire-resistant test. The test was performed by, first, putting the test pieces in an electric furnace heated to 500° C., leaving them for 40 minutes, then taking out the test pieces from the furnace and cooling them, and then measuring the thicknesses of the test pieces.

When the thickness (thickness after expansion) of a test piece after the fire-resistant test was 4 mm or more, the test piece was accepted, and when the thickness was smaller than 4 mm, the test piece was rejected.

TABLE 1

|  |  |  | Example 1 | Example 2 | Comparative Example 1 | Comparative Example 2 | Comparative Example 3 |
|---|---|---|---|---|---|---|---|
| Blend component | Vinyl chloride resin | part | 100 | 100 | 100 | 100 | 100 |
|  | Heat-expandable graphite | part | 1 | 10 | 0 | 12 | 0 |
|  | Calcium carbonate | part | 1 | 1 | 1 | 1 | 5 |
|  | Lead-based stabilizer | part | 2 | 2 | 2 | 2 | 2 |
|  | Lubricant | part | 0.5 | 0.5 | 0.5 | 0.5 | 0.5 |
| Fire-resistance evaluation | Smoke-generating time | min | 120 ○ | 120 ○ | 55 X | 45 X | 60 X |
| Performance evaluation | Tensile strength (MPa) | MPa | 52 ◉ | 45 ◉ | 53 ◉ | 43 ○ | 51 ◉ |
| Molding property evaluation |  |  | ○ | ○ | ○ | ○ | ○ |

TABLE 2

|  |  |  | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Blend component | Vinyl chloride resin | part | 100 | 100 | 100 | 100 | 100 | 100 | 100 | 100 | 100 | 100 |
|  | Heat-expandable graphite | part | 5 | 5 | 5 | 5 | 5 | 5 | 5 | 5 | 5 | 5 |
|  | Calcium carbonate | part | 1 | 2 | 5 | 6 | 12.5 | 25 | 37.5 | 50 | 0 | 60 |
|  | Lead-based stabilizer | part | 2 | 2 | 2 | 2 | 2 | 2 | 2 | 2 | 2 | 2 |
|  | Lubricant | part | 0.5 | 0.5 | 0.5 | 0.5 | 0.5 | 0.5 | 0.5 | 0.5 | 0.5 | 0.5 |
| Fire-resistance evaluation | Smoke-generating time | min | 120 ○ | 130 ◉ | 130 ◉ | 120 ○ | 120 ○ | 120 ○ | 120 ○ | 120 ○ | 110 Δ | 120 ○ |
| Performance evaluation | Tensile strength | MPa | 49 ◉ | 48 ◉ | 47 ◉ | 47 ◉ | 45 ◉ | 40 ○ | 36 ○ | 32 ○ | 49 ◉ | 28 X |
| Molding property evaluation |  |  | ○ | ○ | ○ | ○ | ○ | ○ | ○ | ○ | ○ | ○ |

TABLE 3

|  |  |  | Example 13 | Example 14 | Example 15 | Example 16 | Comparative Example 4 | Comparative Example 5 |
|---|---|---|---|---|---|---|---|---|
| Blend component | Vinyl chloride resin | part | 100 | 100 | 100 | 100 | 100 | 100 |
|  | Heat-expandable graphite | part | 1 | 4 | 7 | 10 | 0 | 12 |
|  | Calcium carbonate | part | 40 | 40 | 40 | 40 | 40 | 40 |
|  | Lead-based stabilizer | part | 2 | 2 | 2 | 2 | 2 | 2 |
|  | Lubricant | part | 0.5 | 0.5 | 0.5 | 0.5 | 0.5 | 0.5 |
| Fire-resistance evaluation | Smoke-generating time | min | 120 ○ | 120 ○ | 120 ○ | 120 ○ | 72 X | 96 Δ |
| Performance evaluation | Tensile strength | MPa | 38 ○ | 36 ○ | 33 ○ | 31 ○ | 39 ○ | 29 X |
| Molding property evaluation |  |  | ○ | ○ | ○ | ○ | ○ | ○ |

Experimental Results

As shown in Table 1, since heat-expandable graphite was not used in Comparative Examples 1 and 3, the smoke-generating time was short, and thereby the samples were rejected in the fire-resistance evaluation. In Comparative Example 2, since the blending ratio of heat-expandable graphite was too large, the smoke-generating time was short, and thereby the sample was rejected in the fire-resistance evaluation.

Furthermore, as shown in Table 3, since heat-expandable graphite was not used in Comparative Example 4, the smoke-generating time was short, and thereby the sample was rejected in the fire-resistance evaluation. In Comparative Example 5, since the blending ratio of heat-expandable graphite was too large, the smoke-generating time did not reach 120 minutes.

Therefore, it was well confirmed that in order to obtain a single-layered fire-resistant piping material that satisfies all the fire-resistance evaluation, performance evaluation, and molding property evaluation requirements, heat-expandable graphite is required to be contained in the range of 1 to 10 parts by weight based on 100 parts by weight of the vinyl chloride resin.

Furthermore, samples in Examples 4 and 5 in Table 2 were further excellent than those in Examples 3 and 6 to 10 in fire-resistance and tensile strength. Therefore, it was confirmed that when a single-layered fire-resistant piping material contains heat-expandable graphite and also an inorganic filler in the ranges of 1 to 10 parts by weight and 2 to 5 parts by weight, respectively, based on 100 parts by weight of the vinyl chloride resin, a pipe being further well-balanced in any of the fire-resistance, tensile strength, and molding properties can be obtained.

Figure 8:
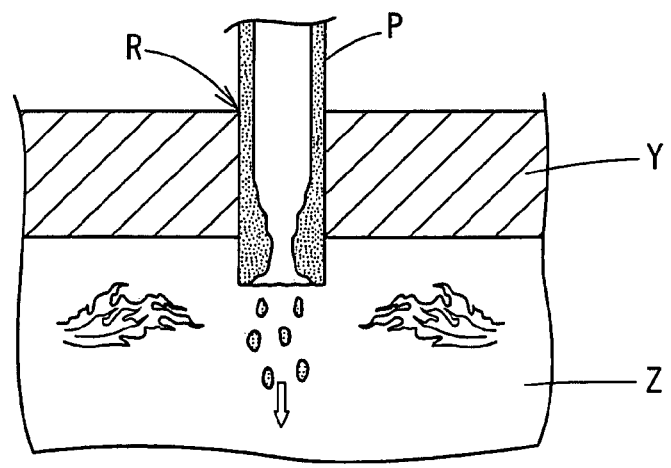
FIG. 8 is an explanatory drawing showing the state that a conventional piping material P was thermally expanded by heating and could not maintain the shape to drop the residue.

Incidentally, when the amount of the heat-expandable graphite was larger than 10 parts by weight, the heated composition was thermally expanded too much to maintain the shape, resulting in dropping of the residue 2, as shown in FIG. 8.

TABLE 4

|  |  |  | Example 17 | Example 18 | Example 19 | Example 20 | Comparative Example 6 | Comparative Example 7 | Comparative Example 8 | Comparative Example 9 |
|---|---|---|---|---|---|---|---|---|---|---|
| Blend component | Vinyl chloride resin | part | 100 | 100 | 100 | 100 | 100 | 100 | 100 | 100 |
|  | Heat-expandable graphite | pH | 1.5 | 2.5 | 3.5 | 4.0 | 0.5 | 1.0 | 4.5 | 7.0 |
|  |  | part | 6 | 6 | 6 | 6 | 6 | 6 | 6 | 6 |
|  | Lead stearate | part | 2 | 2 | 2 | 2 | 2 | 2 | 2 | 2 |
|  | Calcium carbonate | part | 3 | 3 | 3 | 3 | 3 | 3 | 3 | 3 |
|  | Lubricant | part | 0.5 | 0.5 | 0.5 | 0.5 | 0.5 | 0.5 | 0.5 | 0.5 |
| Apparatus corrosive evaluation |  |  | ○ | ○ | ○ | ○ | X | X | ○ | ○ |
| Extrusion molding stability evaluation |  |  | ◉ | ◉ | ◉ | ◉ | ◉ | ◉ | ◉ | ◉ |
| Performance evaluation | Tensile strength | MPa | 48 ◉ | 48 ◉ | 48 ◉ | 48 ◉ | 48 ◉ | 48 ◉ | 48 ◉ | 48 ◉ |
| Fire-resistance evaluation | Smoke-generating time | min | 120 ○ | 140 ◉ | 140 ◉ | 120 ○ | 120 ○ | 120 ○ | 100 Δ | 90 Δ |

TABLE 5

|  |  |  | Example 21 | Example 22 | Example 23 | Example 24 | Example 25 | Comparative Example 10 |
|---|---|---|---|---|---|---|---|---|
| Blend component | Vinyl chloride resin | part | 100 | 100 | 100 | 100 | 100 | 100 |
|  | Heat-expandable graphite | pH | 2.5 | 2.5 | 2.5 | 2.5 | 2.5 | 2.5 |
|  |  | part | 1 | 2.5 | 4 | 8 | 10 | 0 |
|  | Lead stearate | part | 2 | 2 | 2 | 2 | 2 | 2 |
|  | Calcium carbonate | part | 3 | 3 | 3 | 3 | 3 | 3 |
|  | Lubricant | part | 0.5 | 0.5 | 0.5 | 0.5 | 0.5 | 0.5 |
| Apparatus corrosive evaluation |  |  | ○ | ○ | ○ | ○ | ○ | ○ |
| Extrusion molding stability evaluation |  |  | ◉ | ◉ | ◉ | ◉ | ◉ | ◉ |
| Performance evaluation | Tensile strength | MPa | 49 ◉ | 49 ◉ | 48 ◉ | 47 ◉ | 46 ◉ | 53 ◉ |
| Fire-resistance evaluation | Smoke-generating time | min | 120 ○ | 120 ○ | 140 ◉ | 140 ◉ | 120 ○ | 51 X |

|  |  |  | Comparative Example 11 | Comparative Example 12 | Comparative Example 13 | Comparative Example 14 | Comparative Example 15 |
|---|---|---|---|---|---|---|---|
| Blend component | Vinyl chloride resin | part | 100 | 100 | 100 | 100 | 100 |
|  | Heat-expandable graphite | pH | 2.5 | 2.5 | 2.5 |  |  |
|  |  | part | 0.5 | 12 | 15 |  |  |
|  | Lead stearate | part | 2 | 2 | 2 | 2 |  |
|  | Calcium carbonate | part | 3 | 3 | 3 |  | 3 |
|  | Lubricant | part | 0.5 | 0.5 | 0.5 | 0.5 | 0.5 |
| Apparatus corrosive evaluation |  |  | ○ | ○ | ○ | ○ | — |
| Extrusion molding stability evaluation |  |  | ◉ | ◉ | ◉ | ◉ | X |
| Performance evaluation | Tensile strength | MPa | 51 ◉ | 43 ○ | 40 ○ | 53 ◉ | — |
| Fire-resistance evaluation | Smoke-generating time | min | 60 X | 90 Δ | 42 X | 55 X | — |

TABLE 6

|  |  |  | Example 26 | Example 27 | Example 28 | Example 29 | Example 30 | Example 31 |
|---|---|---|---|---|---|---|---|---|
| Blend component | Vinyl chloride resin | part | 100 | 100 | 100 | 100 | 100 | 100 |
|  | Heat-expandable graphite | pH | 2.5 | 2.5 | 2.5 | 2.5 | 2.5 | 2.5 |
|  |  | part | 6 | 6 | 6 | 6 | 6 | 6 |
|  | Lead stearate | part | 0.3 | 0.5 | 3 | 3.5 | 5 | 6 |
|  | Calcium carbonate | part | 3 | 3 | 3 | 3 | 3 | 3 |
|  | Lubricant | part | 0.5 | 0.5 | 0.5 | 0.5 | 0.5 | 0.5 |
| Apparatus corrosive evaluation |  |  | ○ | ○ | ○ | ○ | ○ | ○ |
| Extrusion molding stability evaluation |  |  | ◉ | ◉ | ◉ | ◉ | ◉ | ◉ |
| Performance evaluation | Tensile strength | MPa | 48 ◉ | 48 ◉ | 47 ◉ | 47 ◉ | 46 ◉ | 44 ○ |
| Fire-resistance evaluation | Smoke-generating time | min | 140 ◉ | 140 ◉ | 140 ◉ | 140 ◉ | 120 ○ | 120 ○ |

TABLE 7

|  |  |  | Example 18 | Example 32 | Example 33 | Example 34 |
|---|---|---|---|---|---|---|
| Blend component | Vinyl chloride resin | part | 100 | 100 | 100 | 100 |
|  | Heat-expandable graphite | pH | 2.5 | 2.5 | 2.5 | 2.5 |
|  |  | part | 6 | 6 | 6 | 6 |

TABLE 7-continued

|  |  |  | Example 18 | Example 32 | Example 33 | Example 34 |
|---|---|---|---|---|---|---|
|  | Lead stearate | part | 2 |  |  |  |
|  | Octyltin mercapto | part |  | 2 |  |  |
|  | Ca/Zn-based composite stabilizer | part |  |  | 3 |  |
|  | Epoxidized soybean oil | part |  |  |  | 3 |
|  | Calcium carbonate | part | 3 | 3 | 3 | 3 |
|  | Lubricant | part | 0.5 | 0.5 | 0.5 | 0.5 |
| Apparatus corrosive evaluation |  |  | ○ | ○ | ○ | ○ |
| Extrusion molding stability evaluation |  |  | ◎ | ◎ | ◎ | X |
| Performance evaluation | Tensile strength | MPa | 48 ◎ | 46 ◎ | 47 ◎ | 43 ○ |
| Fire-resistance evaluation | Smoke-generating time | min | 140 ◎ | 140 ◎ | 140 ◎ | 120 ○ |

TABLE 8

|  |  |  | Example 35 | Example 36 | Example 37 | Example 18 | Example 38 | Example 39 |
|---|---|---|---|---|---|---|---|---|
| Blend component | Vinyl chloride resin | part | 100 | 100 | 100 | 100 | 100 | 100 |
|  | Heat-expandable | pH | 2.5 | 2.5 | 2.5 | 2.5 | 2.5 | 2.5 |
|  | graphite | part | 6 | 6 | 6 | 6 | 6 | 6 |
|  | Lead stearate | part | 2 | 2 | 2 | 2 | 2 | 2 |
|  | Calcium carbonate | part | 0 | 0.3 | 0.5 | 3.0 | 5 | 8 |
|  | Lubricant | part | 0.5 | 0.5 | 0.5 | 0.5 | 0.5 | 0.5 |
| Apparatus corrosive evaluation |  |  | ○ | ○ | ○ | ○ | ○ | ○ |
| Extrusion molding stability evaluation |  |  | ○ | ◎ | ◎ | ◎ | ◎ | ◎ |
| Performance evaluation | Tensile strength | MPa | 49 ◎ | 49 ◎ | 49 ◎ | 48 ◎ | 47 ◎ | 45 ◎ |
| Fire-resistance evaluation | Smoke-generating time | min | 140 ◎ | 140 ◎ | 140 ◎ | 140 ◎ | 120 ○ | 120 ○ |

TABLE 9

|  |  |  | Example 2 | Example 40 | Example 41 |
|---|---|---|---|---|---|
| Blend component | Vinyl chloride resin | part | 100 | 100 | 100 |
|  | Heat-expandable | pH | 2.5 | 2.5 | 2.5 |
|  | graphite | part | 6 | 6 | 6 |
|  | Lead stearate | part | 2 | 2 | 2 |
|  | Calcium carbonate | part | 3 |  |  |
|  | Magnesium hydroxide | part |  | 3 |  |
|  | Hydrotalcite | part |  |  | 3 |
|  | Lubricant | part | 0.5 | 0.5 | 0.5 |
| Apparatus corrosive evaluation |  |  | ○ | ○ | ○ |
| Extrusion molding stability evaluation |  |  | ◎ | ◎ | X |
| Performance evaluation | Tensile strength | MPa | 48 ◎ | 48 ◎ | 48 ◎ |
| Fire-resistance evaluation | Smoke-generating time | min | 140 ◎ | 120 ○ | 120 ○ |

Experimental Results

As shown in Table 4, in Comparative Examples 6 and 7, since the acidity of heat-expandable graphite was too strong, corrosion was observed in the apparatus. In Comparative Examples 8 and 9, the acidity of heat-expandable graphite was too weak, and therefore the carbonization of the vinyl chloride resin during burning was hardly accelerated, resulting in that a smoke-generating time of 120 minutes was not achieved in the fire-resistance evaluation.

It was confirmed from these results that in order to exhibit excellent fire resistance without causing corrosion of apparatus, the pH of heat-expandable graphite is required to be in the range of 1.5 to 4.0.

As shown in Table 5, in Comparative Examples 10 and 11, since the blending ratio of heat-expandable graphite was too small, a smoke-generating time of 120 minutes was not achieved in the fire-resistance evaluation. On the other hand, in Comparative Examples 12 and 13, since the blending ratio of heat-expandable graphite was too large, a smoke-generating time of 120 minutes was not achieved in the fire-resistance evaluation.

It was confirmed from these results that in order to obtain excellent fire resistance while strength necessary as a pipe is maintained, the heat-expandable graphite is required to have a pH of 1.5 to 4.0 and is contained in an amount of 1 to 10 parts by weight based on 100 parts by weight of the vinyl chloride resin. Furthermore, when the amount of the heat-expandable graphite was larger than 10 parts by weight, the heated composition was thermally expanded too much to maintain the shape, resulting in dropping of the residue 2, as shown in FIG. 8.

As shown in Table 6, in Example 31, since the additive amount of the stabilizer is too large, the tensile strength was lower than those in Examples 26 to 30.

As shown in Table 7, in Example 34, epoxidized soybean oil was blended as an additive for providing heat stability during molding. Epoxidized soybean oil does not have high ability of providing heat stability during molding, but has high effect of plasticization. As a result, the sample of Example 34 was rejected in the extrusion molding stability and was also slightly reduced in tensile strength and fire resistance, compared to those in other Examples shown in Table 7.

It was confirmed from these results that in order to obtain a pipe that is excellent in tensile strength and fire resistance and also excellent in molding stability, it is preferred that at least one selected from the group consisting of lead-based stabilizers, organic tin-based stabilizers, and higher fatty acid metal salts be contained as the additive for providing heat stability during molding in a total additive amount of 0.3 to 5.0 parts by weight based on 100 parts by weight of the polyvinyl chloride-based resin.

As shown in Table 8, in Example 35, since calcium carbonate serving as a basic compound was not contained, the extrusion molding stability was slightly lower than those in other Examples shown in Table 8. On the other hand, in Example 39, the additive amount of calcium carbonate serving as a basic compound was too large, and thereby the tensile strength was slightly lower than those in other Examples shown in Table 8.

As shown in Table 9, in Example 41, no stabilizer was blended as the additive for providing heat stability during molding, and only hydrotalcite was blended. Though hydrotalcite has an ability of providing heat stability, sufficient heat stability cannot be achieved by hydrotalcite alone. Consequently, the sample was rejected in the extrusion molding stability.

It was confirmed from these results that in order to obtain a pipe that is excellent in tensile strength and fire resistance and also excellent in molding stability, it is further preferred that each of a stabilizer as the additive for providing heat stability during molding and a basic compound be contained in an amount of 0.3 to 5.0 parts by weight based on 100 parts by weight of the vinyl chloride resin.

TABLE 10

|  |  |  | Example 42 | Example 43 | Example 44 | Example 45 | Example 46 | Example 47 | Example 48 | Example 49 | Example 50 | Example 51 |
|---|---|---|---|---|---|---|---|---|---|---|---|---|
| Blend component | Vinyl chloride resin | part | 100 | 100 | 100 | 100 | 100 | 100 | 100 | 100 | 100 | 100 |
|  | Heat-expandable graphite | part | 1 | 3 | 6 | 8 | 10 | 6 | 6 | 6 | 6 | 8 |
|  | Organic tin-based stabilizer | part | 1 | 1 | 1 | 1 | 1 | 1 | 1 | 1 | 1 | 1 |
|  | Lubricant | part | 0.5 | 0.5 | 0.5 | 0.5 | 0.5 | 0.5 | 0.5 | 0.5 | 0.5 | 0.5 |
|  | Stearic acid | part | 0.5 | 0.5 | 0.5 | 0.5 | 0.5 | 0.5 | 0.5 | 0.5 | 0.5 | 0.5 |
| Expansion volume of heat-expandable graphite |  | mL/g | 200 | 200 | 200 | 200 | 200 | 250 | 190 | 180 | 100 | 150 |
| Heat expansibility evaluation | Thickness after expansion | mm | 4 | 7 | 10 | 12 | 13 | 12 | 9 | 10 | 5 | 12 |
|  |  |  | ○ | ○ | ○ | ○ | ○ | ○ | ○ | ○ | ○ | ○ |
| Performance evaluation | Tensile strength | MPa | 52 | 51 | 48 | 47 | 45 | 48 | 48 | 48 | 48 | 47 |
|  |  |  | ◎ | ◎ | ◎ | ◎ | ◎ | ◎ | ◎ | ◎ | ◎ | ◎ |
| Fire-resistance evaluation | Smoke-generating time | min | 120 | 120 | 120 | 120 | 120 | 120 | 120 | 120 | 120 | 120 |
|  |  |  | ○ | ○ | ○ | ○ | ○ | ○ | ○ | ○ | ○ | ○ |
|  | Pipe inner cross-sectional area proportion | % | 50 | 45 | 40 | 25 | 20 | 35 | 40 | 40 | 47 | 40 |
|  |  |  | ○ | ○ | ○ | ○ | ○ | ○ | ○ | ○ | ○ | ○ |

TABLE 11

|  |  |  | Example 52 | Example 53 | Example 54 | Example 55 | Example 56 | Example 57 | Comparative Example 16 | Comparative Example 17 | Comparative Example 18 |
|---|---|---|---|---|---|---|---|---|---|---|---|
| Blend component | Vinyl chloride resin | part | 100 | 100 | 100 | 100 | 100 | 100 | 100 | 100 | 100 |
|  | Heat-expandable graphite | part | 1 | 3 | 6 | 10 | 6 | 6 | 0 | 15 | 6 |
|  | Calcium carbonate | part |  |  |  |  | 6 | 10 |  |  | 15 |
|  | Organic tin-based stabilizer | part | 1 | 1 | 1 | 1 | 1 | 1 | 1 | 1 |  |
|  | Lubricant | part | 0.5 | 0.5 | 0.5 | 0.5 | 0.5 | 0.5 | 0.5 | 0.5 |  |
|  | Stearic acid | part | 0.5 | 0.5 | 0.5 | 0.5 | 0.5 | 0.5 | 0.5 | 0.5 |  |
| Expansion volume of heat-expandable graphite |  | mL/g | 180 | 180 | 180 | 180 | 180 | 180 |  | 200 | 180 |

TABLE 11-continued

|  |  |  | Example 52 | Example 53 | Example 54 | Example 55 | Example 56 | Example 57 | Comparative Example 16 | Comparative Example 17 | Comparative Example 18 |
|---|---|---|---|---|---|---|---|---|---|---|---|
| Heat expansibility evaluation | Thickness after expansion | mm | 4 ○ | 7 ○ | 10 ○ | 13 ○ | 12 ○ | 12 ○ | 0 X | 0 X broken | 12 ○ |
| Performance evaluation | Tensile strength | MPa | 52 ◉ | 51 ◉ | 48 ◉ | 45 ◉ | 46 ◉ | 45 ◉ | 53 ◉ | 41 ○ | 43 ○ |
| Fire-resistance evaluation | Smoke-generating time | min | 120 ○ | 120 ○ | 120 ○ | 120 ○ | 120 ○ | 120 ○ | 50 X | 55 X | 120 ○ |
|  | Pipe inner cross-sectional area proportion | % | 50 ○ | 45 ○ | 40 ○ | 20 ○ | 40 ○ | 35 ○ | burned-out X | dropped X | 55 X |

TABLE 12

|  |  |  | Example 58 | Example 59 | Example 60 | Example 61 | Example 62 | Example 63 | Example 64 | Example 65 |
|---|---|---|---|---|---|---|---|---|---|---|
| Blend component | Vinyl chloride resin | part | 100 | 100 | 100 | 100 | 100 | 100 | 100 | 100 |
|  | Heat-expandable graphite | part | 1 | 4 | 7 | 10 | 5 | 5 | 5 | 5 |
|  | Calcium carbonate | part | 3 | 3 | 3 | 3 | 0 | 1 | 5 | 7 |
|  | Lead-based stabilizer | part | 2 | 2 | 2 | 2 | 2 | 2 | 2 | 2 |
|  | Lubricant | part | 0.5 | 0.5 | 0.5 | 0.5 | 0.5 | 0.5 | 0.5 | 0.5 |
| Heat expansibility evaluation | Thickness after expansion | mm | 4 ○ | 8 ○ | 11 ○ | 13 ○ | 8 ○ | 8 ○ | 9 ○ | 10 ○ |
| Performance evaluation | Tensile strength | MPa | 51 ◉ | 49 ◉ | 46 ◉ | 45 ◉ | 49 ◉ | 49 ◉ | 47 ◉ | 47 ◉ |
| Fire-resistance evaluation | Smoke-generating time | min | 120 ○ | 140 ◉ | 140 ◉ | 120 ○ | 120 ○ | 140 ◉ | 140 ◉ | 120 ○ |
|  | Pipe inner cross-sectional area proportion | % | 50 ○ | 5 ◉ | 5 ◉ | 20 ○ | 35 ○ | 10 ◉ | 10 ◉ | 35 ○ |
|  | Elongated length | mm | 30 ○ | 120 ○ | 80 ○ | 40 ○ | 40 ○ | 100 ○ | 90 ○ | 20 ○ |

TABLE 13

|  |  |  | Example 66 | Example 67 | Example 68 | Example 69 | Example 70 | Comparative Example 19 | Comparative Example 20 |
|---|---|---|---|---|---|---|---|---|---|
| Blend component | Vinyl chloride resin | part | 100 | 100 | 100 | 100 | 100 | 100 | 100 |
|  | Heat-expandable graphite | part | 5 | 5 | 5 | 5 | 5 | 0 | 15 |
|  | Calcium carbonate | part | 3 | 3 | 3 | 3 | 0 | 3 | 3 |
|  | Lead-based stabilizer | part | 0.1 | 0.3 | 3 | 5 | 7 | 2 | 2 |
|  | Lubricant | part | 0.5 | 0.5 | 0.5 | 0.5 | 0.5 | 0.5 | 0.5 |
| Heat expansibility evaluation | Thickness after expansion | mm | 9 ○ | 9 ○ | 9 ○ | 9 ○ | 8 ○ | 0 X | 0 X |
| Performance evaluation | Tensile strength | MPa | 48 ◉ | 48 ◉ | 48 ◉ | 48 ◉ | 49 ◉ | 52 ◉ | 40 ○ |
| Molding property evaluation |  |  | Δ slight drift | ○ | ○ | ○ | ○ | ○ | ○ |
| Fire-resistance evaluation | Smoke-generating time | min | 120 ○ | 140 ◉ | 140 ◉ | 140 ◉ | 120 ○ | 50 X | 55 X |
|  | Pipe inner cross-sectional area proportion | % | 20 ○ | 10 ◉ | 5 ◉ | 10 ◉ | 45 ○ | burned-out X | dropped X |
|  | Elongated length | mm | 30 ○ | 100 ○ | 100 ○ | 80 ○ | 30 ○ | 0 X | 10 X |

Experimental Results

As shown in Tables 11 and 13, in Comparative Examples 16 and 19, since heat-expandable graphite was not blended at all, the piping material burned out. As a result, the increase in temperature of the piping material was rapid on the heating side, and thereby the smoke-generating time was short.

In Comparative Examples 17 and 20, since the blended amount of the heat-expandable graphite was too large, the piping material could not maintain the shape thereof after expansion, and dropped. As a result, the temperature of the piping material was rapidly increased on the heating side, and thereby the smoke-generating time was short.

Furthermore, when the amount of the heat-expandable graphite was larger than 10 parts by weight, the heated composition was thermally expanded too much to maintain the shape, resulted in dropping of the residue, as shown in FIG. 8.

Therefore, it was well confirmed that in order to obtain a single-layered fire-resistant piping material that satisfies all the heat expansibility evaluation, performance evaluation, and fire-resistance evaluation requirements, the heat-expandable graphite is required to have an expansion volume of 100 to 250 mL/g and to be contained in the range of 1 to 10 parts by weight based on 100 parts by weight of the vinyl chloride resin.

Furthermore, in Examples 42 to 70, not only the tensile strength necessary as a pipe was achieved, but also the smoke-generating time was drastically elongated, compared to those in Comparative Examples. This may be caused by that in Examples 42 to 70, the pipe inner cross-section was caulked with the residue to inhibit an increase in temperature of the pipe.

Furthermore, in Examples 59 and 60, not only the pipe inner cross-sectional area proportion but also the elongated length L of the residue H was excellent, compared to those in Examples 58 and 61. In Examples 63 and 64, not only the pipe inner cross-sectional area proportion but also the elongated length L of the residue H was excellent, compared to those in Examples 62 and 65. In addition, in Examples 67 to 69, not only the pipe inner cross-sectional area proportion but also the elongated length L of the residue H was excellent, compared to those in Examples 66 and 70. As a result, in these Examples, the smoke-generating time was further improved compared to other Examples.

Incidentally, when a synthetic resin piping material constructed so as to pass through a floor material is heated from the underside of the floor, first, the portion of the piping material protruding below the floor is directly heated to start softening and burning. Then, a difference in hardness occurs between the portion lying inside the composition and the burning portion of the floor piping material, causing sharp softening. Then, the portion of the piping material protruding below the floor falls apart from the floor and drops (falls away) about 5 to 20 minutes after the start of the burning. The bottom surface of the remaining piping material is in nearly the same plane as the bottom surface of the floor. When the heat is further applied, the phenomena vary depending on the blending composition of the piping material.

Figure 9:
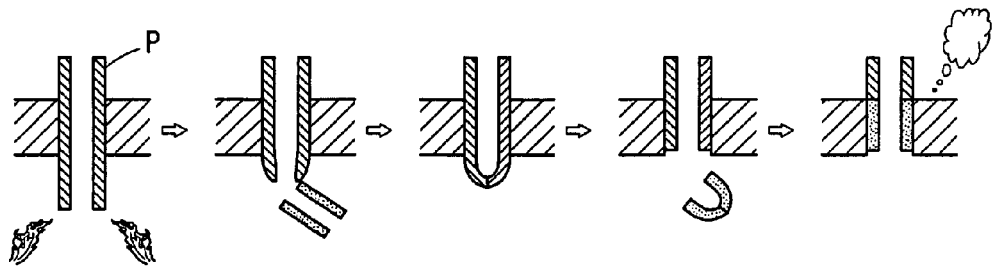
FIG. 9 is an explanatory drawing schematically showing the state of burning of a conventional piping material P constructed so as to pass through a flooring material.

Specifically, in the piping material composed of the composition shown in Comparative Example 19, as shown in FIG. 9, after the portion protruding below the floor dropped, the resin run down to once caulk the end on the heating side. However, since no heat-expandable graphite was blended, fire resistance was not obtained, and the end of the piping material on the heating side dropped after all. As a result, hot air flowed in the inside of the pass-through portion of the piping material, and the potion inside the floor structure burned out to generate smoke on the non-heating side.

Since the piping material composed of the composition shown in Comparative Example 20 contained a large amount of heat-expandable graphite, the heated composition was expanded too much to maintain the shape, resulting in dropping.

Figure 10:
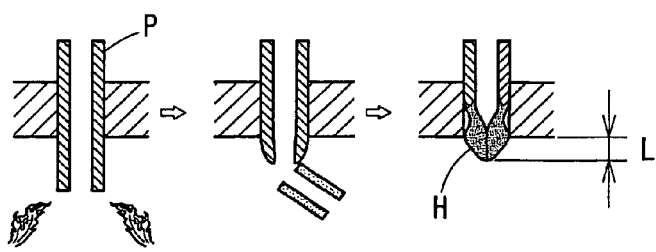
FIG. 10 is an explanatory drawing schematically showing the state of burning of a piping material P according to the present invention constructed so as to pass through a flooring material.

On the other hand, in the piping materials composed of compositions shown in Examples 66 to 70, as shown in FIG. 10, after the portion protruding below the floor dropped, the remaining portion was softened from the lower part by being heated, and the inner diameter slightly shrank in the direction in which the pipe contracts. Then, the heat-expandable graphite started expanding by heating. The expansion continued in the central direction of the pipe cross-section till that the pipe inner cross-sectional area after burning became 50% or less of the pipe inner cross-sectional area before the burning. The residue after the expansion was thought that the main component thereof was a graphite crystal, which gives a very strong, flame-retardant residue H extending from the underside of the floor to the heating side and can prevent itself from dropping and burning. As a result, even though the underside of the floor was heated to 1000° C. or higher, the residue H did not drop from the underside of the floor, and a state of almost caulking the pipe continued for a long period of time. In addition, since the pipe inner cross-sectional area was reduced during burning and also the residue extended to the heating side, hot air was prevented from ascending inside the pipe and an increase in temperature of the piping material on the non-heating side with respect to the floor surface could be suppressed. As a result, the piping material was prevented from burning out, and also smoke generation on the non-heating side, which is caused by softening of the piping material to form a gap with the mortar interface, was prevented.

Therefore, it was confirmed that in order to obtain a single-layered fire-resistant piping material that satisfies all the strength as a pipe, stability during molding, and caulking of the end on the heating side of the pipe during heating, it is necessary that heat-expandable graphite having an expansion volume in the range of 100 to 250 mL/g is contained in an amount of 1 to 10 parts by weight based on 100 parts by weight of the vinyl chloride resin.

Furthermore, it was confirmed that further preferred blending ratios are, based on 100 parts by weight of the vinyl chloride resin, 4 to 7 parts by weight of the heat-expandable graphite having an expansion volume in the range of 100 to 250 mL/g, 1 to 5 parts by weight of calcium carbonate serving as the inorganic filler, and 0.3 to 5 parts by weight of the stabilizer.

TABLE 14

|  |  |  | Example 71 | Example 72 | Example 73 | Example 74 | Example 75 | Comparative Example 21 | Comparative Example 22 |
| --- | --- | --- | --- | --- | --- | --- | --- | --- | --- |
| Blend component | Vinyl chloride resin | part | 100 | 100 | 100 | 100 | 100 | 100 | 100 |
|  | Heat-expandable graphite | part | 1 | 10 | 5 | 5 | 5 | 0 | 12 |
|  | Lead-based stabilizer | part | 2 | 2 | 2 | 2 | 2 | 2 | 2 |
|  | Lubricant | part | 0.5 | 0.5 | 0.5 | 0.5 | 0.5 | 0.5 | 0.5 |

TABLE 14-continued

|  |  |  | Example 71 | Example 72 | Example 73 | Example 74 | Example 75 | Comparative Example 21 | Comparative Example 22 |
|---|---|---|---|---|---|---|---|---|---|
| 1.3-time expansion temperature |  | ° C. | 200 | 200 | 180 | 240 | 200 | — | 200 |
| Resin temperature during molding |  | ° C. | 180 | 180 | 170 | 210 | 195 | 180 | 180 |
| Fire-resistance evaluation | Smoke-generating time | min | 120 ○ | 120 ○ | 120 ○ | 120 ○ | 120 ○ | 55 X | 90 Δ |
| Performance evaluation | Tensile strength | MPa | 52 ◉ | 45 ◉ | 49 ◉ | 49 ◉ | 49 ◉ | 53 ◉ | 43 ○ |
| Molding property evaluation |  |  | ○ | ○ | ○ | ○ | ○ | ○ | ○ |

Experimental Results

It was confirmed that in order to provide strength necessary as a pipe and to exhibit excellent fire resistance, it is necessary that the heat-expandable graphite having a 1.3-time expansion temperature T3 of 180 to 240° C. is contained in an amount of 1 to 10 parts by weight based on 100 parts by weight of the vinyl chloride resin.

When the amount of the heat-expandable graphite was larger than 10 parts by weight, the heated composition was thermally expanded too much to maintain the shape, resulting in dropping of the residue 2, as shown in FIG. 8.

TABLE 15

|  | Blend component |  | Example 76 | Example 77 | Example 78 | Example 79 | Example 80 | Comparative Example 23 | Comparative Example 24 |
|---|---|---|---|---|---|---|---|---|---|
| Inner side covering layer | Vinyl chloride resin | part | — | — | — | — | — | — | — |
|  | Lead-based stabilizer | part | — | — | — | — | — | — | — |
|  | Lubricant | part | — | — | — | — | — | — | — |
|  | Calcium carbonate | part | — | — | — | — | — | — | — |
| Fire-resistant expandable layer | Vinyl chloride resin | part | 100 | 100 | 100 | 100 | 100 | 100 | 100 |
|  | Lead-based stabilizer | part | 2 | 2 | 2 | 2 | 2 | 2 | 2 |
|  | Lubricant | part | 0.5 | 0.5 | 0.5 | 0.5 | 0.5 | 0.5 | 0.5 |
|  | Calcium carbonate | part | 3 | 3 | 3 | 3 | 3 | 3 | 3 |
|  | Heat-expandable graphite | part | 1 | 2 | 7 | 14 | 15 | 0 | 17 |
| Outer side covering layer | Vinyl chloride resin | part | 100 | 100 | 100 | 100 | 100 | 100 | 100 |
|  | Lead-based stabilizer | part | 2 | 2 | 2 | 2 | 2 | 2 | 2 |
|  | Lubricant | part | 0.5 | 0.5 | 0.5 | 0.5 | 0.5 | 0.5 | 0.5 |
|  | Calcium carbonate | part | 3 | 3 | 3 | 3 | 3 | 3 | 3 |
| Layer thickness (thickness proportion %) | Inner side covering layer | mm | — | — | — | — | — | — | — |
|  | Fire-resistant expandable layer | mm | 5.61 (85%) | 5.61 (85%) | 5.61 (85%) | 5.61 (85%) | 5.61 (85%) | 5.61 (85%) | 5.61 (85%) |
|  | Outer side covering layer | mm | 0.99 (15%) | 0.99 (15%) | 0.99 (15%) | 0.99 (15%) | 0.99 (15%) | 0.99 (15%) | 0.99 (15%) |
| Fire-resistance evaluation | Smoke-generating time | min | ○ 120 | ○ 120 | ◉ 131 | ○ 127 | ○ 120 | X 55 | X 45 |
| Performance evaluation | Tensile strength | MPa | ◉ 51.4 | ◉ 50.7 | ◉ 47.3 | ○ 42.6 | ○ 41.9 | ◉ 52.1 | ○ 40.5 |

TABLE 16

|  | Blend component |  | Example 81 | Example 82 | Example 83 | Example 84 | Example 85 | Comparative Example 25 | Comparative Example 26 |
|---|---|---|---|---|---|---|---|---|---|
| Inner side covering layer | Vinyl chloride resin | part | 100 | 100 | 100 | 100 | 100 | 100 | 100 |
|  | Lead-based stabilizer | part | 2 | 2 | 2 | 2 | 2 | 2 | 2 |
|  | Lubricant | part | 0.5 | 0.5 | 0.5 | 0.5 | 0.5 | 0.5 | 0.5 |
|  | Calcium carbonate | part | 3 | 3 | 3 | 3 | 3 | 3 | 3 |
| Fire-resistant expandable layer | Vinyl chloride resin | part | 100 | 100 | 100 | 100 | 100 | 100 | 100 |
|  | Lead-based stabilizer | part | 2 | 2 | 2 | 2 | 2 | 2 | 2 |
|  | Lubricant | part | 0.5 | 0.5 | 0.5 | 0.5 | 0.5 | 0.5 | 0.5 |
|  | Calcium carbonate | part | 3 | 3 | 3 | 3 | 3 | 3 | 3 |
|  | Heat-expandable graphite | part | 1 | 2 | 7 | 14 | 15 | 0 | 17 |
| Outer side covering layer | Vinyl chloride resin | part | — | — | — | — | — | — | — |
|  | Lead-based stabilizer | part | — | — | — | — | — | — | — |
|  | Lubricant | part | — | — | — | — | — | — | — |
|  | Calcium carbonate | part | — | — | — | — | — | — | — |
| Layer thickness (thickness proportion %) | Inner side covering layer | mm | 0.99 (15%) | 0.99 (15%) | 0.99 (15%) | 0.99 (15%) | 0.99 (15%) | 0.99 (15%) | 0.99 (15%) |
|  | Fire-resistant expandable layer | mm | 5.61 (85%) | 5.61 (85%) | 5.61 (85%) | 5.61 (85%) | 5.61 (85%) | 5.61 (85%) | 5.61 (85%) |
|  | Outer side covering layer | mm | — | — | — | — | — | — | — |
| Fire-resistance evaluation | Smoke-generating time | min | ○ 120 | ○ 120 | ◉ 130 | ○ 126 | ○ 120 | X 57 | X 48 |

TABLE 16-continued

| | Blend component | | Example 81 | Example 82 | Example 83 | Example 84 | Example 85 | Comparative Example 25 | Comparative Example 26 |
|---|---|---|---|---|---|---|---|---|---|
| Performance evaluation | Tensile strength | MPa | ◉ 51.2 | ◉ 50.8 | ◉ 47.5 | ○ 42.5 | ○ 41.7 | ◉ 51.9 | ○ 40.4 |

TABLE 17

| | Blend component | | Example 86 | Example 87 | Example 88 | Example 89 | Example 90 | Comparative Example 27 | Comparative Example 28 |
|---|---|---|---|---|---|---|---|---|---|
| Inner side covering layer | Vinyl chloride resin | part | 100 | 100 | 100 | 100 | 100 | 100 | 100 |
| | Lead-based stabilizer | part | 2 | 2 | 2 | 2 | 2 | 2 | 2 |
| | Lubricant | part | 0.5 | 0.5 | 0.5 | 0.5 | 0.5 | 0.5 | 0.5 |
| | Calcium carbonate | part | 3 | 3 | 3 | 3 | 3 | 3 | 3 |
| Fire-resistant expandable layer | Vinyl chloride resin | part | 100 | 100 | 100 | 100 | 100 | 100 | 100 |
| | Lead-based stabilizer | part | 2 | 2 | 2 | 2 | 2 | 2 | 2 |
| | Lubricant | part | 0.5 | 0.5 | 0.5 | 0.5 | 0.5 | 0.5 | 0.5 |
| | Calcium carbonate | part | 3 | 3 | 3 | 3 | 3 | 3 | 3 |
| | Heat-expandable graphite | part | 1 | 2 | 7 | 14 | 15 | 0 | 17 |
| Outer side covering layer | Vinyl chloride resin | part | 100 | 100 | 100 | 100 | 100 | 100 | 100 |
| | Lead-based stabilizer | part | 2 | 2 | 2 | 2 | 2 | 2 | 2 |
| | Lubricant | part | 0.5 | 0.5 | 0.5 | 0.5 | 0.5 | 0.5 | 0.5 |
| | Calcium carbonate | part | 3 | 3 | 3 | 3 | 3 | 3 | 3 |
| Layer thickness (thickness proportion %) | Inner side covering layer | mm | 0.66 (10%) | 0.66 (10%) | 0.66 (10%) | 0.66 (10%) | 0.66 (10%) | 0.66 (10%) | 0.66 (10%) |
| | Fire-resistant expandable layer | mm | 5.28 (80%) | 5.28 (80%) | 5.28 (80%) | 5.28 (80%) | 5.28 (80%) | 5.28 (80%) | 5.28 (80%) |
| | Outer side covering layer | mm | 0.66 (10%) | 0.66 (10%) | 0.66 (10%) | 0.66 (10%) | 0.66 (10%) | 0.66 (10%) | 0.66 (10%) |
| Fire-resistance evaluation | Smoke-generating time | min | ○ 120 | ○ 120 | ◉ 130 | ○ 125 | ○ 120 | X 54 | X 44 |
| Performance evaluation | Tensile strength | MPa | ◉ 51.5 | ◉ 50.9 | ◉ 47.7 | ○ 43.2 | ○ 42.6 | ◉ 52.2 | ○ 41.3 |

TABLE 18

| | Blend component | | Example 91 | Example 92 | Example 93 | Example 94 | Example 95 | Example 96 | Example 97 | Example 98 |
|---|---|---|---|---|---|---|---|---|---|---|
| Inner side covering layer | Vinyl chloride resin | part | 100 | 100 | 100 | 100 | 100 | 100 | 100 | 100 |
| | Lead-based stabilizer | part | 2 | 2 | 2 | 2 | 2 | 2 | 2 | 2 |
| | Lubricant | part | 0.5 | 0.5 | 0.5 | 0.5 | 0.5 | 0.5 | 0.5 | 0.5 |
| | Calcium carbonate | part | 3 | 3 | 3 | 3 | 3 | 3 | 3 | 3 |
| Fire-resistant expandable layer | Vinyl chloride resin | part | 100 | 100 | 100 | 100 | 100 | 100 | 100 | 100 |
| | Lead-based stabilizer | part | 2 | 2 | 2 | 2 | 2 | 2 | 2 | 2 |
| | Lubricant | part | 0.5 | 0.5 | 0.5 | 0.5 | 0.5 | 0.5 | 0.5 | 0.5 |
| | Calcium carbonate | part | 40 | 40 | 40 | 40 | 40 | 40 | 40 | 40 |
| | Heat-expandable graphite | part | 5 | 5 | 5 | 5 | 5 | 5 | 5 | 5 |
| | Ammonium polyphosphate | part | 0 | 0 | 0 | 0 | 0 | 0 | 0 | 0 |
| Outer side covering layer | Vinyl chloride resin | part | — | — | — | — | — | 100 | 100 | 100 |
| | Lead-based stabilizer | part | — | — | — | — | — | 2 | 2 | 2 |
| | Lubricant | part | — | — | — | — | — | 0.5 | 0.5 | 0.5 |
| | Calcium carbonate | part | — | — | — | — | — | 3 | 3 | 3 |
| Layer thickness (thickness proportion %) | Inner side covering layer | mm | 5.94 (90%) | 4.62 (70%) | 3.3 (50%) | 1.98 (30%) | 0.66 (10%) | 0.66 (10%) | 1.5 (23%) | 2.64 (40%) |
| | Fire-resistant expandable layer | mm | 0.66 (10%) | 1.98 (30%) | 3.3 (50%) | 4.62 (70%) | 5.94 (90%) | 5.28 (80%) | 3.6 (54%) | 1.32 (20%) |
| | Outer side covering layer | mm | — | — | — | — | — | 0.66 (10%) | 1.5 (23%) | 2.64 (40%) |
| Fire-resistance evaluation | Smoke-generating time | min | ○ 120 | ○ 120 | ○ 120 | ○ 120 | ○ 120 | ○ 120 | ○ 120 | ○ 120 |
| Performance evaluation | Tensile strength | MPa | ◉ 50.0 | ◉ 49.1 | ◉ 48.2 | ◉ 47.2 | ◉ 46.3 | ◉ 46.7 | ◉ 48.0 | ◉ 49.6 |

TABLE 19

| | Blend component | | Comparative Example 29 | Comparative Example 30 |
|---|---|---|---|---|
| Inner side covering layer | Vinyl chloride resin | part | — | 100 |
| | Lead-based stabilizer | part | — | 2 |
| | Lubricant | part | — | 0.5 |
| | Calcium carbonate | part | — | 3 |
| Fire-resistant expandable layer | Vinyl chloride resin | part | 100 | — |
| | Lead-based stabilizer | part | 2 | — |
| | Lubricant | part | 0.5 | — |
| | Calcium carbonate | part | 100 | — |
| | Heat-expandable graphite | part | 30 | — |
| | Ammonium polyphosphate | part | 100 | — |
| Outer side covering layer | Vinyl chloride resin | part | — | — |
| | Lead-based stabilizer | part | — | — |
| | Lubricant | part | — | — |
| | Calcium carbonate | part | — | — |
| Layer thickness (thickness proportion %) | Inner side covering layer | mm | — | 6.6 (100%) |
| | Fire-resistant expandable layer | mm | 6.6 (100%) | — |
| | Outer side covering layer | mm | — | — |
| Fire-resistance evaluation | Smoke-generating time | min | ○ 120 | X 55 flame burst |
| Performance evaluation | Tensile strength | MPa | ○ 33.4 | ◎ 50.5 |

Experimental Results

As shown in Tables 15 to 19, in Comparative Examples 23 to 28 and 30, the smoke-generating time was short, and the samples were rejected in the fire-resistance evaluation. In addition, in Comparative Example 29, the tensile strength was slightly low. Therefore, in order to obtain a multilayered fire-resistant piping material that satisfies both the fire-resistance evaluation and performance evaluation requirements, it is necessary, as shown in Examples 76 to 90, that the material include a tubular fire-resistant expandable layer composed of a heat-expandable fire-resistant resin composition and a covering layer covering at least one of the outer surface and the inner surface of the fire-resistant expandable layer, the fire-resistant expandable layer is formed of a fire-resistant resin composition containing heat-expandable graphite in an amount of 1 to 15 parts by weight based on 100 parts by weight of the vinyl chloride resin, and the covering layer is formed of a vinyl chloride resin composition not containing heat-expandable fire-resistant materials.

When the amount of the heat-expandable graphite was larger than 15 parts by weight, the heated test piping material P was thermally expanded too much to maintain the shape, resulting in dropping of the residue, as shown in FIG. 8.

TABLE 20

| | Blend component | | Example 99 | Example 100 | Example 101 | Example 102 | Example 103 | Example 104 | Example 105 | Example 106 | Comparative Example 31 |
|---|---|---|---|---|---|---|---|---|---|---|---|
| Inner side covering layer | Vinyl chloride resin | part | 100 | 100 | 100 | 100 | 100 | 100 | 100 | 100 | 100 |
| | Lead-based stabilizer | part | 2 | 2 | 2 | 2 | 2 | 2 | 2 | 2 | 2 |
| | Lubricant | part | 0.5 | 0.5 | 0.5 | 0.5 | 0.5 | 0.5 | 0.5 | 0.5 | 0.5 |
| | Calcium carbonate | part | 3 | 3 | 3 | 3 | 3 | 3 | 3 | 3 | 3 |
| Fire-resistant expandable layer | Vinyl chloride resin | part | 100 | 100 | 100 | 100 | 100 | 100 | 100 | 100 | 100 |
| | Lead-based stabilizer | part | 2 | 2 | 2 | 2 | 2 | 2 | 2 | 2 | 2 |
| | Lubricant | part | 0.5 | 0.5 | 0.5 | 0.5 | 0.5 | 0.5 | 0.5 | 0.5 | 0.5 |
| | Calcium carbonate | part | 3 | 3 | 3 | 3 | 3 | 3 | 3 | 3 | 3 |
| | Heat-expandable graphite | part | 5 | 10 | 15 | 10 | 10 | 10 | 10 | 10 | 17 |
| | 1.3-time expansion temperature | °C. | 210 | 210 | 210 | 170 | 180 | 190 | 240 | 250 | 210 |
| Outer side covering layer | Vinyl chloride resin | part | 100 | 100 | 100 | 100 | 100 | 100 | 100 | 100 | 100 |
| | Lead-based stabilizer | part | 2 | 2 | 2 | 2 | 2 | 2 | 2 | 2 | 2 |
| | Lubricant | part | 0.5 | 0.5 | 0.5 | 0.5 | 0.5 | 0.5 | 0.5 | 0.5 | 0.5 |
| | Calcium carbonate | part | 3 | 3 | 3 | 3 | 3 | 3 | 3 | 3 | 3 |
| Layer thickness (thickness proportion %) | Inner side covering layer | mm | 0.66 (10%) | 0.66 (10%) | 0.66 (10%) | 0.66 (10%) | 0.66 (10%) | 0.66 (10%) | 0.66 (10%) | 0.66 (10%) | 0.66 (10%) |
| | Fire-resistant expandable layer | mm | 5.28 (80%) | 5.28 (80%) | 5.28 (80%) | 5.28 (80%) | 5.28 (80%) | 5.28 (80%) | 5.28 (80%) | 5.28 (80%) | 5.28 (80%) |
| | Outer side covering layer | mm | 0.66 (10%) | 0.66 (10%) | 0.66 (10%) | 0.66 (10%) | 0.66 (10%) | 0.66 (10%) | 0.66 (10%) | 0.66 (10%) | 0.66 (10%) |
| Fire-resistance evaluation | Smoke-generating time | min | ○ 125 | ○ 127 | ○ 123 | ○ 120 | ○ 122 | ○ 125 | ○ 123 | ○ 120 | X 58 |
| Performance evaluation | Tensile strength | MPa | ◎ 49.0 | ◎ 45.8 | ○ 42.6 | ◎ 45.2 | ◎ 45.4 | ◎ 45.7 | ◎ 45.9 | ○ 44.5 | ○ 41.3 |

Experimental Results

As shown in Table 20, in Comparative Example 31, the smoke-generating time was very short, compared to those in Examples 99 to 101, and the sample was rejected in the fire-resistance evaluation.

In Examples 102 and 106, the smoke-generating time was slightly short, and the samples were slightly inferior in the fire-resistance evaluation, compared to those in Examples 100, 103, 104, and 105.

Therefore, it was confirmed that in order to satisfy both the fire-resistance evaluation and performance evaluation requirements, it is preferable that the fire-resistant expandable layer 11 is formed of a fire-resistant resin composition containing heat-expandable graphite having a 1.3-time expansion temperature in the range of 180 to 240° C. in an amount of 5 to 15 parts by weight based on 100 parts by weight of the polyvinyl chloride-based resin.

TABLE 21

| | Blend component | | Example 107 | Example 108 | Example 109 | Example 110 | Example 111 | Example 112 | Example 113 |
|---|---|---|---|---|---|---|---|---|---|
| Inner side covering layer | Vinyl chloride resin | part | 100 | 100 | 100 | 100 | 100 | 100 | 100 |
| | Lead-based stabilizer | part | 2 | 2 | 2 | 2 | 2 | 2 | 2 |
| | Lubricant | part | 0.5 | 0.5 | 0.5 | 0.5 | 0.5 | 0.5 | 0.5 |
| | Calcium carbonate | part | 3 | 3 | 3 | 3 | 3 | 3 | 3 |
| Fire-resistant expandable layer | Vinyl chloride resin | part | 100 | 100 | 100 | 100 | 100 | 100 | 100 |
| | Lead-based stabilizer | part | 2 | 2 | 2 | 2 | 2 | 2 | 2 |
| | Lubricant | part | 0.5 | 0.5 | 0.5 | 0.5 | 0.5 | 0.5 | 0.5 |
| | Calcium carbonate | part | 3 | 3 | 3 | 3 | 3 | 3 | 3 |
| | Heat-expandable graphite | part | 10 | 10 | 10 | 10 | 10 | 10 | 10 |
| | 1.3-time expansion temperature | ° C. | 210 | 210 | 210 | 210 | 210 | 210 | 210 |
| Outer side covering layer | Vinyl chloride resin | part | 100 | 100 | 100 | 100 | 100 | 100 | 100 |
| | Lead-based stabilizer | part | 2 | 2 | 2 | 2 | 2 | 2 | 2 |
| | Lubricant | part | 0.5 | 0.5 | 0.5 | 0.5 | 0.5 | 0.5 | 0.5 |
| | Calcium carbonate | part | 3 | 3 | 3 | 3 | 3 | 3 | 3 |
| Layer thickness (thickness proportion %) | Inner side covering layer | mm | 0.2 (3%) | 0.5 (8%) | 1.0 (15%) | 1.5 (23%) | 2.0 (30%) | 0.1 (2%) | 2.2 (33%) |
| | Fire-resistant expandable layer | mm | 6.2 (94%) | 5.6 (85%) | 4.6 (70%) | 3.6 (55%) | 2.6 (40%) | 6.4 (97%) | 2.2 (33%) |
| | Outer side covering layer | mm | 0.2 (3%) | 0.5 (8%) | 1.0 (15%) | 1.5 (23%) | 2.0 (30%) | 0.1 (2%) | 2.2 (33%) |
| Fire-resistance evaluation | Smoke-generating time | min | ◉ 130 | ○ 128 | ○ 125 | ○ 123 | ○ 122 | ◉ 132 | ○ 120 |
| Performance evaluation | Tensile strength | MPa | ○ 43.4 | ◉ 45.8 | ◉ 46.7 | ◉ 48.6 | ◉ 49.4 | ○ 39.8 | ◉ 49.5 |

Experimental Results

As shown in Table 21, in Example 112, since the thicknesses of the inner side covering layer 12 and the outer side covering layer 13 were each extremely thin, 0.1 mm, the tensile strength was slightly inferior, compared to those in other Examples. On the other hand, in Example 113, since the thicknesses of the inner side covering layer 12 and the outer side covering layer 13 were each extremely thick, 2.2 mm, the fire resistance was slightly inferior, compared to those in other Examples.

Therefore, it was confirmed that it is preferable that the thicknesses of the inner side covering layer 12 and the outer side covering layer 13 each be in the range of 0.2 to 2.0 mm.

TABLE 22

| | Blend component | | Example 114 | Example 115 | Example 116 | Comparative Example 32 | Comparative Example 33 |
|---|---|---|---|---|---|---|---|
| Inner side covering layer | Vinyl chloride resin | part | 100 | 100 | 100 | 100 | 100 |
| | Lead-based stabilizer | part | 2 | 2 | 2 | 2 | 2 |
| | Lubricant | part | 0.5 | 0.5 | 0.5 | 0.5 | 0.5 |
| | Calcium carbonate | part | 3 | 3 | 3 | 3 | 3 |
| Fire-resistant expandable layer | Vinyl chloride resin | part | 100 | 100 | 100 | 100 | 100 |
| | Lead-based stabilizer | part | 2 | 2 | 2 | 2 | 2 |
| | Lubricant | part | 0.5 | 0.5 | 0.5 | 0.5 | 0.5 |
| | Calcium carbonate | part | 3 | 3 | 3 | 3 | 3 |
| | Heat-expandable graphite | part | 10 | 10 | 10 | 10 | 10 |
| | 1.3-time expansion temperature | ° C. | 230 | 230 | 230 | 230 | 230 |
| Outer side covering layer | Vinyl chloride resin | part | 100 | 100 | 100 | 100 | 100 |
| | Lead-based stabilizer | part | 2 | 2 | 2 | 2 | 2 |

TABLE 22-continued

| | Blend component | | Example 114 | Example 115 | Example 116 | Comparative Example 32 | Comparative Example 33 |
|---|---|---|---|---|---|---|---|
| | Lubricant | part | 0.5 | 0.5 | 0.5 | 0.5 | 0.5 |
| | Calcium carbonate | part | 3 | 3 | 3 | 3 | 3 |
| Layer thickness (thickness proportion %) | Inner side covering layer | mm | 1.0 (15%) | 1.0 (15%) | 1.0 (15%) | 1.0 (15%) | 1.0 (15%) |
| | Fire-resistant expandable layer | mm | 4.6 (70%) | 4.6 (70%) | 4.6 (70%) | 4.6 (70%) | 4.6 (70%) |
| | Outer side covering layer | mm | 1.0 (15%) | 1.0 (15%) | 1.0 (15%) | 1.0 (15%) | 1.0 (15%) |
| Resin temperature during molding | | °C. | 170 | 190 | 210 | 160 | 220 |
| Fire-resistance evaluation | Smoke-generating time | min | ○ 125 | ○ 126 | ○ 125 | ○ 120 | ○ 120 |
| Performance evaluation | Tensile strength | MPa | ◉ 45.3 | ◉ 46.7 | ◉ 46.9 | ○ 35.6 | ○ 38.9 |

Experimental Results

As shown in Table 22, in Comparative Example 32, since the resin temperature during molding was too low, the tensile strength was slightly inferior. Furthermore, in Comparative Example 33, since the resin temperature during molding was too high, the tensile strength was slightly inferior. Therefore, it is preferable that the resin temperature during molding of the resin composition be 170 to 210° C.

1.3-time expansion temperature of the heat-expandable graphite was higher than 240° C., the smoke-generating time was slightly short, and the tensile strength was slightly inferior, compared to those in Examples 117 to 119.

Therefore, it was confirmed that it is preferable that the resin temperature during molding be lower than the 1.3-time expansion temperature of heat-expandable graphite by 5° C. and be in 170 to 210° C.

TABLE 23

| | Blend component | | Example 117 | Example 118 | Example 119 | Example 120 | Comparative Example 34 |
|---|---|---|---|---|---|---|---|
| Inner side covering layer | Vinyl chloride resin | part | 100 | 100 | 100 | 100 | 100 |
| | Lead-based stabilizer | part | 2 | 2 | 2 | 2 | 2 |
| | Lubricant | part | 0.5 | 0.5 | 0.5 | 0.5 | 0.5 |
| | Calcium carbonate | part | 3 | 3 | 3 | 3 | 3 |
| Fire-resistant expandable layer | Vinyl chloride resin | part | 100 | 100 | 100 | 100 | 100 |
| | Lead-based stabilizer | part | 2 | 2 | 2 | 2 | 2 |
| | Lubricant | part | 0.5 | 0.5 | 0.5 | 0.5 | 0.5 |
| | Calcium carbonate | part | 3 | 3 | 3 | 3 | 3 |
| | Heat-expandable graphite | part | 10 | 10 | 10 | 10 | 10 |
| | 1.3-time expansion temperature | °C. | 180 | 200 | 240 | 250 | 160 |
| Outer side covering layer | Vinyl chloride resin | part | 100 | 100 | 100 | 100 | 100 |
| | Lead-based stabilizer | part | 2 | 2 | 2 | 2 | 2 |
| | Lubricant | part | 0.5 | 0.5 | 0.5 | 0.5 | 0.5 |
| | Calcium carbonate | part | 3 | 3 | 3 | 3 | 3 |
| Layer thickness (thickness proportion %) | Inner side covering layer | mm | 1.0 (15%) | 1.0 (15%) | 1.0 (15%) | 1.0 (15%) | 1.0 (15%) |
| | Fire-resistant expandable layer | mm | 4.6 (70%) | 4.6 (70%) | 4.6 (70%) | 4.6 (70%) | 4.6 (70%) |
| | Outer side covering layer | mm | 1.0 (15%) | 1.0 (15%) | 1.0 (15%) | 1.0 (15%) | 1.0 (15%) |
| Resin temperature during molding | | °C. | 170 | 195 | 210 | 180 | 170 |
| Fire-resistance evaluation | Smoke-generating time | min | ○ 129 | ○ 123 | ○ 125 | ○ 120 | ○ 120 |
| Performance evaluation | Tensile strength | MPa | ◉ 46.5 | ◉ 46.7 | ◉ 46.8 | ○ 40.2 | ○ 36.6 |

Experimental Results

As shown in Table 23, in Comparative Example 23, since the 1.3-time expansion temperature of the heat-expandable graphite was lower than the resin temperature during molding by 10° C., the tensile strength was lower than those in Examples 117 to 120. Furthermore, in Example 120, since the

CONCLUSION

Figure 11:
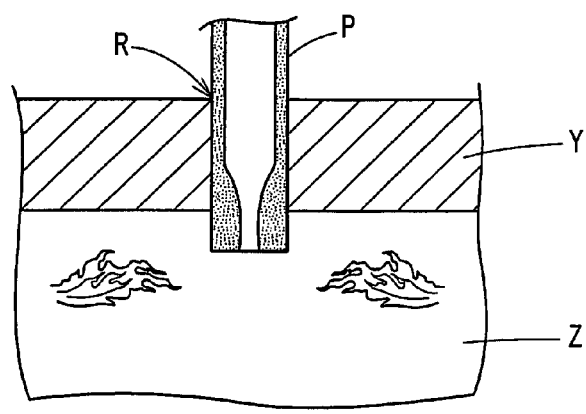
FIG. 11 is an explanatory drawing showing the state of a piping material P according to the present invention that holds the shape to maintain the fire resistance after being thermally expanded by heating.

As described in detail with reference to Examples in the above, in the single-layered fire-resistant piping material and the multilayered fire-resistant piping material according to the present invention, each layer constituted of a fire-resistant resin composition effectively expands during burning, and, as shown in FIG. 11, the residue caulks the gap between the piping material and the compartment pass-through portion and the inside of the piping material to prevent flame and smoke from penetrating to the other side partitioned by the floor material. The piping materials are thus excellent in fire resistance and also excellent in molding properties and have mechanical strength sufficient as pipes.

Furthermore, unlike a piping structure in which only the compartment pass-through portion is subjected to fire-resistant treatment with a conventional fire-resistant expandable sheet-like covering material, the present invention can impart fire resistance to the entire piping.

In the present fire-resistance evaluation, the fire resistance was compared by an alternative evaluation technique in which heating is conducted under a condition that one end of a piping material protrudes in a fire-resistant furnace by 300 mm. In the case of a fire under a condition that the piping material of the present invention is practically constructed in a building so as to pass through each slab of every floor or each partition wall of every floor, the difference in fire resistance may be further distinguished.

That is, the piping material of the present invention rapidly and reliably caulks the compartment pass-through portion during burning, and also the entire pipe can undergo burning for a long period of time. Even if the piping material partially dropped during burning, it is suggested that the opening portion of the piping material is quickly caulked to maintain the shape, and thereby flame and smoke hardly penetrate to the outside of the burning chamber, resulting in prevention of the fire from spreading.

Furthermore, in the multilayered fire-resistant piping material having an inner side covering layer, the inner circumference surface of the piping material is smooth and thereby can allow fluid to smoothly pass, and also the inner circumference surface of the piping material is excellent in chemical proof and thereby hardly limits the type of fluid, which allows general purpose application.

In addition, in the multilayered fire-resistant piping material having an outer side covering layer, the outer circumference surface of the piping material is excellent in adhesion and, for example, can be easily and reliably connected to another member such as a pipe joint.

Furthermore, the multilayered fire-resistant piping material of the present invention is not limited to the above-described Examples. For example, in the Examples, the piping materials have a nominal diameter of 100 mm, but may have a nominal diameter different therefrom.

The invention claimed is:
1. A fire-resistant pipe, comprising
a pipe wall having a hollow tubular interior space for conveying a fluid therethrough,
    wherein the pipe wall consists of a triple layer construction,
    wherein the pipe wall comprises
        a tubular fire-resistant expandable layer made of a heat-expandable fire-resistant polyvinyl chloride-based resin composition,
        a covering layer covering the outer surface of the fire-resistant expandable layer, and
        a covering layer covering the inner surface of the fire-resistant expandable layer,
    wherein the fire-resistant expandable layer comprises
        a fire-resistant polyvinyl chloride-based resin composition containing a heat-expandable graphite having
            an expansion volume in the range of 100 to 250 mL/g and a 1.3-time expansion temperature of 180 to 240° C. in an amount of 1 to 15 parts by weight based on 100 parts by weight of the polyvinyl chloride-based resin; and
    wherein the covering layers comprise
        a polyvinyl chloride-based resin composition not containing heat-expandable fire-resistant materials, and
    wherein the pipe wall has a tensile strength of 30 MPa or greater,
wherein,
    when the pipe is subjected to a fire-resistant test complying with ISO 834-1,
        wherein the pipe is passed through a flooring material,
        wherein the underside of the flooring material is heated,
        wherein one end of the pipe is exposed to a heated side by 300 mm from the surface on the heated side of the flooring material, and
        wherein the other end of the pipe is exposed to a non-heated side by 800 mm from the surface on the non-heated side of the flooring material,
    the inner cross-sectional area S1 at the end of the pipe on the heated side and the inner cross-sectional area S2 at a minimum inner diameter of the pipe after burning satisfy the relationship:

$$(S2/S1) \times 100 \leq 50.$$

* * * * *